US011010193B2

(12) United States Patent
Karanasos et al.

(10) Patent No.: US 11,010,193 B2
(45) Date of Patent: May 18, 2021

(54) EFFICIENT QUEUE MANAGEMENT FOR CLUSTER SCHEDULING

(71) Applicant: Microsoft Technology Licensing, LLC, Redmond, WA (US)

(72) Inventors: Konstantinos Karanasos, San Francisco, CA (US); Sriram Rao, Sunnyvale, CA (US); Srikanth Kandula, Redmond, WA (US); Milan Vojnovic, Cambridgeshire (GB); Jeffrey Thomas Rasley, Providence, RI (US); Rodrigo Lopes Cancado Fonseca, Providence, RI (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 228 days.

(21) Appl. No.: 15/954,311

(22) Filed: Apr. 16, 2018

(65) Prior Publication Data
US 2018/0300174 A1 Oct. 18, 2018

Related U.S. Application Data

(60) Provisional application No. 62/486,190, filed on Apr. 17, 2017.

(51) Int. Cl.
*G06F 9/46* (2006.01)
*G06F 9/48* (2006.01)
*G06F 9/50* (2006.01)

(52) U.S. Cl.
CPC .......... *G06F 9/4881* (2013.01); *G06F 9/5083* (2013.01)

(58) Field of Classification Search
CPC ...................................... G06F 9/4881
USPC ........................................... 718/103
See application file for complete search history.

(56) References Cited

U.S. PATENT DOCUMENTS

| 5,541,912 A | * | 7/1996 | Choudhury | ......... H04L 12/5601 370/412 |
| 5,699,537 A | * | 12/1997 | Sharangpani | ......... G06F 9/3822 712/217 |
| 7,065,764 B1 | * | 6/2006 | Prael | ..................... G06F 9/5072 703/2 |

(Continued)

FOREIGN PATENT DOCUMENTS

| CN | 101958808 B | 5/2012 |
| CN | 104142855 A | 11/2014 |

OTHER PUBLICATIONS

Alizadeh, et al., "pFabric: Minimal Near-optimal Datacenter Transport", In Proceedings of ACM SIGCOMM conference on SIGCOMM, Aug. 12, 2013, pp. 435-446.

(Continued)

*Primary Examiner* — Mehran Kamran
(74) *Attorney, Agent, or Firm* — Workman Nydegger

(57) ABSTRACT

Embodiments for efficient queue management for cluster scheduling and managing task queues for tasks which are to be executed in a distributed computing environment. Both centralized and distributed scheduling is provided. Task queues may be bound by length-based bounding or delay-based bounding. Tasks may be prioritized and task queues may be dynamically reordered based on task priorities. Job completion times and cluster resource utilization may both be improved.

19 Claims, 9 Drawing Sheets

(56) References Cited

U.S. PATENT DOCUMENTS

| | | | | |
|---|---|---|---|---|
| 7,464,380 | B1* | 12/2008 | Hempel | G06F 9/5033 709/231 |
| 8,706,798 | B1* | 4/2014 | Suchter | G06F 9/5038 709/202 |
| 8,984,519 | B2* | 3/2015 | Cadambi | G06F 9/505 718/103 |
| 9,141,432 | B2* | 9/2015 | Chen | G06F 9/5044 |
| 9,176,785 | B2* | 11/2015 | Jackson | G06F 9/505 |
| 2006/0037021 | A1* | 2/2006 | Anand | G06F 9/4881 718/102 |
| 2007/0143765 | A1* | 6/2007 | Aridor | G06F 9/5011 718/104 |
| 2007/0256077 | A1* | 11/2007 | Zhong | G06F 9/505 718/104 |
| 2008/0103861 | A1* | 5/2008 | Zhong | G05B 19/41865 705/80 |
| 2012/0096470 | A1* | 4/2012 | Bartfai-Walcott | G06F 9/4881 718/103 |
| 2012/0124591 | A1* | 5/2012 | Cadambi | G06F 9/505 718/103 |
| 2012/0173609 | A1* | 7/2012 | Kulaga | H04L 41/0816 709/203 |
| 2012/0254300 | A1* | 10/2012 | Rai | H04L 67/1002 709/203 |
| 2013/0054809 | A1* | 2/2013 | Urmanov | G06F 9/505 709/226 |
| 2013/0066951 | A1* | 3/2013 | Agranat | H04J 14/0227 709/203 |
| 2014/0115163 | A1* | 4/2014 | Matousek | H04L 47/762 709/226 |
| 2015/0058858 | A1* | 2/2015 | Plattner | G06F 9/4881 718/103 |
| 2015/0067028 | A1* | 3/2015 | Kumar | H04L 67/10 709/203 |
| 2015/0106819 | A1* | 4/2015 | Kim | G06F 9/5038 718/103 |
| 2015/0248313 | A1* | 9/2015 | Vijayarangan | G06F 9/4887 718/104 |
| 2016/0335135 | A1* | 11/2016 | Jang | G06F 9/524 |
| 2017/0147400 | A1* | 5/2017 | Achouche | G06F 9/54 |
| 2017/0185648 | A1* | 6/2017 | Kavulya | G06F 16/24545 |
| 2017/0250923 | A1* | 8/2017 | Eker | H04L 43/0894 |
| 2018/0074855 | A1* | 3/2018 | Kambatla | G06F 9/5083 |
| 2018/0349178 | A1* | 12/2018 | Painter | G06F 9/485 |

OTHER PUBLICATIONS

Ananthanarayanan, et al., "Reining in the Outliers in Mapreduce Clusters Using Mantri", In Proceedings of 9th Usenix Symposium on Operating Systems Design and Implementation, Oct. 4, 2010, 14 pages.
Anderson, et al., "Operating Systems: Principles and Practice", In Publication of Recursive books, Aug. 21, 2012, 469 Pages.
"Hadoop: Capacity Scheduler", Retrieved from «https://hadoop.apache.org/docs/current/hadoop-yarn/hadoop-yarn-site/CapacityScheduler.html», Retrieved on: Oct. 16, 2017, 6 Pages.
"Hadoop: Fair Scheduler", Retrieved from «https://hadoop.apache.org/docs/current/hadoop-yarn/hadoop-yarn-site/FairScheduler.html», Retrieved on: Oct. 16, 2017, 8 Pages.
"Apache Hadoop", Retrieved from «http://hadoop.apache.org/», Retrieved on: Oct. 16, 2017, 10 Pages.
"Apache Tez", Retrieved from «https://tez.apache.org/», Retrieved on: Oct. 16, 2017, 1 Page.
Boutin, et al., "Apollo: Scalable and Coordinated Scheduling for Cloud-Scale Computing", In Proceedings of the 11th USENIX conference on Operating Systems Design and Implementation, Oct. 6, 2014, pp. 285-300.
Dean, et al., "The tail at scale", In Proceedings of Communications of the ACM, vol. 56, Issue 2, Feb. 2013, pp. 74-80.
Delgado, et al., "Hawk: Hybrid datacenter scheduling", In Proceedings of the USENIX Annual Technical Conference, Jul. 8, 2015, pp. 499-510.

Delimitrou, et al., "Tarcil: Reconciling scheduling speed and quality in large shared clusters", In Proceedings of the Sixth ACM Symposium on Cloud Computing, Aug. 27, 2015, pp. 97-110.
Ferguson, et al., "Jockey: Guaranteed job latency in data parallel clusters", In Proceedings of the 7th ACM European Conference on Computer Systems, Apr. 10, 2012, pp. 99-112.
Ghodsi, et al., "Dominant Resource Fairness: Fair Allocation of Multiple Resource Types", In Proceedings of the 8th USENIX Conference on Networked Systems Design and Implementation, Mar. 30, 2011, pp. 1-14.
Goder, et al., "Bistro: Scheduling data-parallel jobs against live production systems", In Proceedings of the USENIX Annual Technical Conference, Jul. 8, 2015 , pp. 459-471.
Grandl, et al., "Multi-Resource Packing for Cluster Schedulers", In Proceedings of the ACM conference on SIGCOMM, Aug. 17, 2014, pp. 455-466.
Grosvenor, et al., "Queues don't matter when you can JUMP them!", In Proceedings of the 12th USENIX Conference on Networked Systems Design and Implementation, May 4, 2015, pp. 1-14.
"GridMix", Retrieved from «https://hadoop.apache.org/docs/r1.2.1/gridmix.html», Retrieved on: Oct. 16, 2017, 7 Pages.
Hindman, et al., "Mesos: A Platform For Fine-Grained Resource Sharing In The Data Center", In Proceedings of the 8th USENIX conference on Networked systems design and implementation, Mar. 30, 2011, pp. 1-14.
Hong, et al., "Finishing Flows Quickly with Preemptive Scheduling", In Proceedings of ACM SIGCOMM Conference on Applications, technologies, architectures, and protocols for computer communication, Aug. 13, 2012, pp. 127-138.
Karanasos, et al., "Mercury: Hybrid Centralized and Distributed Scheduling in Large Shared Clusters", In Proceedings of USENIX Annual Technical Conference, Jul. 8, 2015, pp. 485-497.
Ousterhout, et al., "The case for tiny tasks in compute clusters", In Proceedings of 14th USENIX conference on Hot Topics in Operating Systems, May 13, 2013, 6 Pages.
Ousterhout, et al., "Sparrow: Distributed, low latency scheduling", In Proceedings of the Twenty-Fourth ACM Symposium on Operating Systems Principles, Nov. 3, 2013, pp. 69-84.
Rasley, et al., "Efficient queue management for cluster scheduling", In Proceedings of the Eleventh European Conference on Computer Systems, Apr. 18, 2016, 15 Pages.
Schwarzkopf, et al., "Omega: Flexible, Scalable Schedulers for Large Compute Clusters", In Proceedings of the 8th ACM European Conference on Computer Systems, Apr. 15, 2013, pp. 351-364.
Shreedhar, et al., "Efficient fair queueing using deficit round robin", In Proceedings of the conference on Applications, Technologies, Architectures, and Protocols for Computer Communication, Aug. 28, 1995, pp. 231-242.
"Under the Hood: Scheduling MapReduce jobs more efficiently with Corona", Retrieved from «https://www.facebook.com/notes/facebook-engineering/under-the-hood-scheduling-mapreduce-jobs-more-efficiently-with-corona/10151142560538920», Nov. 9, 2012, 5 Pages.
Vavilapalli, et al., "Apache Hadoop YARN: Yet another Resource Negotiator", In Proceedings of the 4th annual Symposium on Cloud Computing, Oct. 1, 2013, 16 Pages.
Verma, et al., "Large-scale cluster management at Google with Borg", In Proceedings of the Tenth European Conference on Computer Systems, Apr. 21, 2015, 17 Pages.
"Extend YARN to support distributed scheduling", Retrieved from «https://issues.apache.org/jira/browse/YARN-2877», Retrieved on: Oct. 16, 2017, 16 Pages.
"Queuing of container requests in the NM", Retrieved from «https://issues.apache.org/jira/browse/YARN-2883», Retrieved on: Oct. 16, 2017, 60 Pages.
Zaharia, et al., "Improving mapreduce performance in heterogeneous environments", In Proceedings of 8th USENIX conference on Operating systems design and implementation, Dec. 8, 2008, pp. 29-42.
Zaharia, et al., "Spark: Cluster computing with working sets", In Proceedings of the 2nd USENIX conference on Hot topics in cloud computing, Jun. 22, 2010, pp. 1-7.

(56) References Cited

OTHER PUBLICATIONS

Zats, et al., "Detail: Reducing the Flow Completion Time Tail in Datacenter Networks", In Proceedings of the ACM SIGCOMM conference on Applications, Technologies, Architectures, and Protocols for Computer Communication, Aug. 13, 2012, pp. 139-150.
Thusoo, et al., "Hive: A Warehousing Solution Over a Map-Reduce Framework", In Proceedings of the VLDB Endowment, vol. 2, Issue 2, Aug. 24, 2009, pp. 1626-1629.

\* cited by examiner

EFFICIENT QUEUE MANAGEMENT FOR CLUSTER SCHEDULING

CROSS-REFERENCE TO RELATED APPLICATIONS

This application is claims priority to and benefit from U.S. Provisional Patent Application No. 62/486,190, filed Apr. 17, 2017, entitled "EFFICIENT QUEUE MANAGEMENT FOR CLUSTER SCHEDULING," and which application is expressly incorporated herein by reference in its entirety.

BACKGROUND

Data-parallel frameworks and scale-out commodity clusters are being increasingly used to store data, perform operations on and with data, and extract value from data. While some enterprises have large clusters, many others use public cloud providers. Such clusters run a wide variety of applications including batch data analytics jobs, machine learning jobs, and interactive queries. To reduce operational costs, and, therefore, improve return on investment, there is a trend toward consolidating diverse workloads onto shared clusters. However, doing so places considerable strain on a cluster scheduler, which has to deal with vastly varying and heterogeneous jobs, while maintaining high cluster utilization, fast and predictable job completion times, and offering expressive sharing policies among users.

Big Data clusters, consisting of several or even a large number of worker nodes, have a job scheduler and/or resource manager that determines how jobs (consisting of multiple tasks that can or may be executed in parallel on the worker nodes) get access to cluster resources.

Previous cluster schedulers such as Apache Hadoop YARN and Google's Borg have a logically centralized service, often called the resource manager (RM), which serves as a matchmaker between the resource needs of various jobs and the available resources on worker machines (nodes). Typically, machines exchange heartbeat messages with the RM once every few seconds, and are initiated either by worker machines (as in YARN) or by the RM (as in Borg). Through heartbeats, worker machines report resource availability to the RM, which in turn determines an allocation of tasks to machines and nodes in a cluster. This design has two main problems: first, the RM is in the critical path of all scheduling decisions; second, whenever a task finishes, resources can remain fallow between heartbeats. These aspects slow down job completion: a job with a handful of short tasks can take tens of seconds to finish. Worse, they can adversely affect cluster utilization especially when tasks are short-lived.

Table 1 shows an average cluster utilization (i.e., the percentage of occupied slots) with tasks of different durations for an 80-node YARN cluster. The label X-sec denotes a synthetic workload wherein every task lasts X seconds. The label Mixed-5-50 is an even mix of 5 sec. and 50 sec. tasks. Workload 1 is an actual production workload shown in FIG. 1. Notably, as task durations get shorter, cluster utilization drastically degrades, and can be as low or lower than 61%.

TABLE 1

Average YARN cluster slot utilization for workloads with varying task durations.

| 5-sec. | 10-sec. | 50-sec. | Mixed-5-50 | Workload 1 |
|---|---|---|---|---|
| 60.59% | 78.35% | 92.38% | 78.54 | 83.38% |

A few schedulers avoid logical centralization. Apollo, Sparrow, and others (as are known in the art) allow job managers to independently decide where to execute their tasks, either to improve scalability (in terms of cluster size or scheduling decisions rate) or to reduce allocation latency. The above problem with short-lived tasks becomes less prevalent, because tasks can be pushed onto queues at worker machines by each job manager. However, these schedulers are vulnerable to other problems including, inter alia:

(a) each job manager achieves a local optimum allocation, but coordination across various job managers to achieve globally optimal allocations is not possible;

(b) worse, the distributed schedulers do not always pick appropriate machines since they fail to account for the pending work in each queue;

(c) the assignments are vulnerable to head-of-line blocking when tasks have heterogeneous resource demands and durations.

These aspects affect job completion times, leading to increased tail latency and unpredictability in job run times To illustrate these aspects, FIG. 2 presents a cumulative distribution function (CDF) of job completion times for Workload 2 with YARN and an implementation of Sparrow's batch sampling on Mercury. It can be seen that the latter improves some very short jobs, but has a long tail of jobs that exhibit longer completion times. As will be shown later, this happens because batch sampling fails to make globally optimal task placement decisions, and because first-in-first-out (FIFO) queues at worker nodes suffer from head-of-line blocking.

In one naive attempt, an extended YARN that allows tasks to be queued at each node, thus masking task allocation delays, was demonstrated. In this case, an RM assigns tasks to node queues in a way that is similar to how it already assigns tasks to nodes. The resulting job completion times are depicted in the "YARN+Q" line of FIG. 2. As shown, naively offering FIFO queues at worker nodes in YARN can be worse than not having queues at all.

BRIEF SUMMARY

Herein are provided methods, systems, and computer program products for managing task queues for tasks which are to be executed in a distributed computing environment. For example, a computer-implemented method may include receiving a job at a cluster for execution. The job may comprise one or more tasks. The method may include determining one or more queue sizes for one or more queues into which tasks are to be placed for execution in the distributed computing environment. A node of a plurality of nodes in the distributed computing environment (e.g., cluster) on which a task is to run may be determined. The task may be placed into a queue such that the task will be run on the determined node. A priority for the task relative to other tasks in the queue may also be determined. Based on the priority of the task, an order of execution for all tasks in the queue may also be determined. The tasks in the queue may then be ordered based on the determined order of execution. The techniques and embodiments provided herein may improve job completion times in a distributed computing environment and may also improve cluster resource utilization when compared to previous solutions.

Herein are also described and provided improved and more principled solutions towards managing and using task queues in the context of cluster schedulers, including both centralized and distributed schedulers. Embodiments include:

Methods and systems for cluster scheduling for tasks in a distributed computing environment. Embodiments include new and improved cluster schedulers termed Yaq (for "Yet another queuing [resource manager]"). Embodiments include centralized cluster scheduling (Yaq-c) and distributed cluster scheduling (Yaq-d). Both centralized cluster scheduling (Yaq-c) and distributed cluster scheduling (Yaq-d) support queuing of tasks at worker nodes and can accommodate additional queue management techniques, as described herein, without losing the attractive features of previous designs.

Methods for adding queues at worker nodes are provided. Naively adding queues at worker nodes is unlikely to work well so improved methods are provided. Embodiments may include techniques to bound the length of queues: using short queues can lead to lulls and thus to lower cluster utilization, whereas using long ones increases queuing delays and encourages sub-optimal early binding of tasks. Techniques for placing tasks to worker machines are discussed and provided when doing so involves picking a run-slot, a queue-slot, or waiting. Also introduced are task prioritization techniques that are novel to worker-side queues in cluster scheduling, and which are crucial for reducing head-of-line blocking and improving job completion times.

Per-queue scheduling techniques are discussed which can be combined well with cluster-wide policies, such as global job prioritization (in centralized designs) and cluster sharing policies.

Implementation of both centralized Yaq-c and distributed Yaq-d is presented and discussed, as are actual results of deploying particular embodiments on an 80-node cluster. Actual experimental results using synthetic and production workloads (derived from and implemented on Microsoft clusters) show that Yaq-c improves median job completion time by 1.7× over prior YARN. Yaq-d improves median job completion time by 9.3× and 3.9×, respectively, relative to an implementation of Sparrow's batch sampling on YARN and of Mercury.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

1. Introduction

Figure 1:
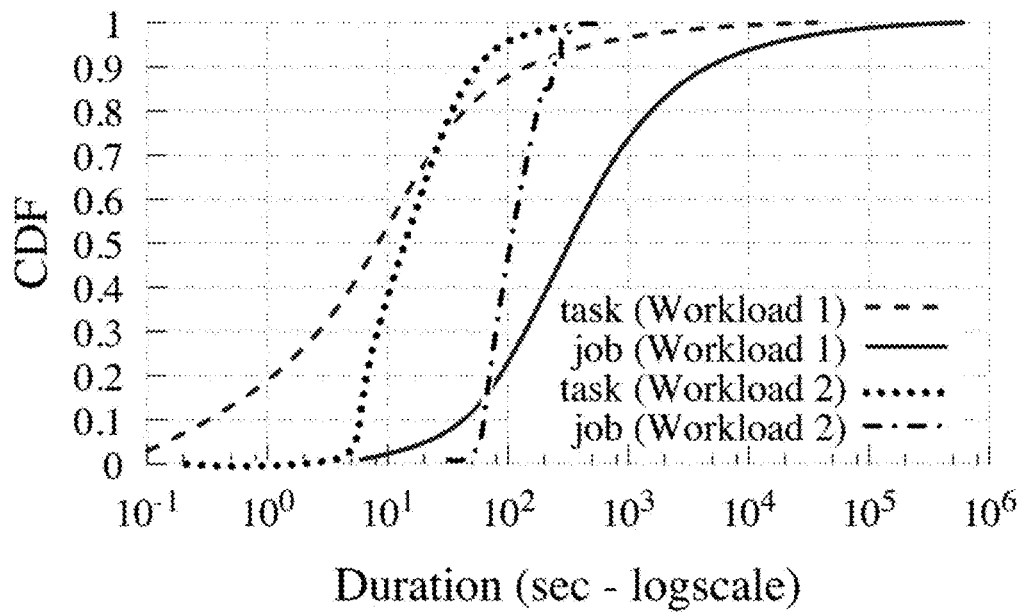
FIG. 1 illustrates job and task durations for production workloads.
Figure 2:
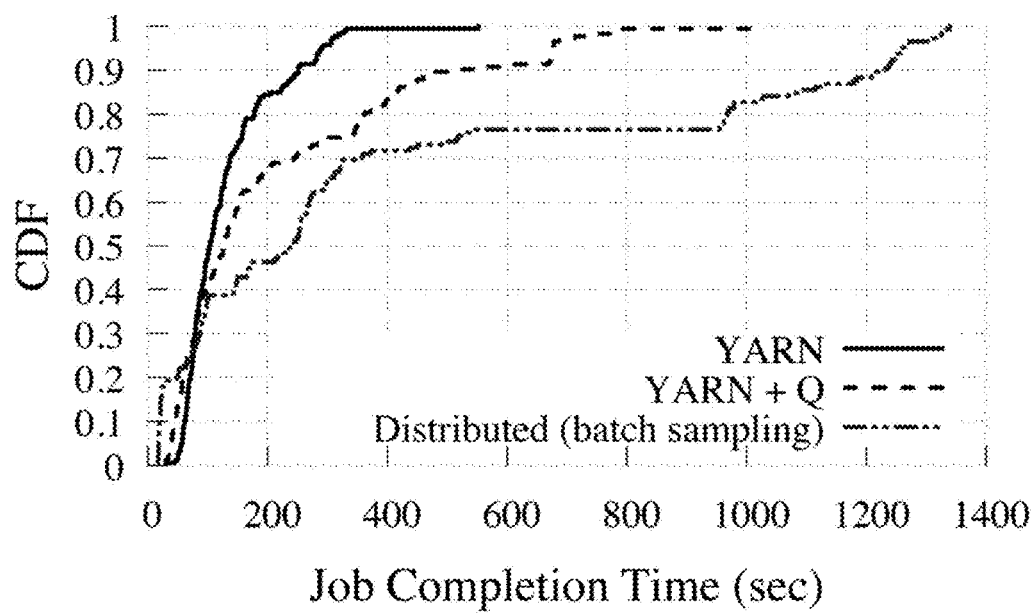
FIG. 2 illustrates job completion times for a production workload using different scheduling types.

Herein are provided methods, systems, and computer program products for managing task queues for tasks which are to be executed in a distributed computing environment. For example, a computer-implemented method may include receiving a job at a cluster for execution. The job may comprise one or more tasks. As may be appreciated, a job may and often does comprise a great many tasks. The method may include determining one or more queue sizes for one or more queues into which tasks are to be placed for execution in the distributed computing environment. A node of a plurality of nodes in the distributed computing environment (e.g., cluster) on which a task is to run may be determined. The task may be placed into a queue such that the task will be run on the determined node. A priority for the task relative to other tasks in the queue may also be determined. Based on the priority of the task, an order of execution for all tasks in the queue may also be determined. The tasks in the queue may then be ordered based on the determined order of execution.

Cluster resource managers can follow a centralized or a distributed design. In centralized designs, there is a central entity that performs all the resource allocations. Such systems can queue tasks centrally. When a task finishes its execution, a node has to request new tasks from the central resource manager, and in turn the node has to wait for the new tasks to arrive. This process might lead to sub-optimal resource utilization, especially when task are short-running. Adding queues of tasks at the worker nodes, so that there are always tasks to be executed when resources become available, can improve resource utilization, but experiments (as described herein) have shown that it can be detrimental for job completion times, if done naively.

In distributed designs, there is no central entity where jobs/tasks get submitted, therefore there is no central queue either. Instead, worker nodes maintain queues by design, since this is the only way to not keep tasks that come from multiple jobs to the same node, since there is no coordination between them. This design can have the problem that due to lack of coordination and global knowledge, tasks might be queued for too long in some queues.

Introduced are techniques that dictate how queues at worker nodes can be maintained in order to achieve both high cluster resource utilization and low job completion times. Such techniques can be applied in any system or application that uses distributed queues. For example, applications may be deployed to clusters and then hold on to these resources, using their own internal scheduling algorithms for determining where their tasks will be placed among those resources. (Spark applications is such an example.) In such cases, techniques described herein can also be used to achieve better job completion times.

Embodiments described herein also include determining appropriate queue sizing, prioritization of task execution via queue reordering, starvation freedom, and careful placement of tasks to queues. Techniques are described which include both a centralized and a distributed scheduler. Performance of particular embodiments described herein are evaluated on a variety of synthetic and production workloads. A centralized implementation as described herein, Yaq-c, achieves 1.7× improvement on median job completion time compared to prior YARN, and a distributed embodiment as described herein, Yaq-d, achieves 9.3× improvement over an implementation of Sparrow batch sampling on YARN and a 3.9× improvement over Mercury.

A discussion of various embodiments and examples of methods, systems, and computer program products for managing task queues for tasks which are to be executed in a distributed computing environment follows. These methods, systems, and computer program products describe and provide various and alternative embodiments for efficient queue management for cluster scheduling.

2. Design

Herein is described a design of two cluster scheduler variations, Yaq-c (a centralized scheduler) and Yaq-d (a distributed scheduler), within which are implemented new queue management techniques. Yaq-c extends a centralized scheduler in YARN by adding task queues at worker nodes. Yaq-d, on the other hand, is a distributed scheduler that extends, for example, a Mercury scheduler. Certain requirements for a scheduler (Section 2.1) will be discussed. A description of queuing techniques employed in certain embodiments are provided. Yaq's capabilities are compared with those of some prior scheduling frameworks (Section 2.2). Components of a system design for certain embodiments are presented (Section 2.3). Design details for both Yaq-c and Yaq-d are provided (Section 2.4 and Section 2.5)

2.1 Design Considerations

Resource managers for large shared clusters need to meet various, often conflicting, requirements. Cluster operators and users have indicated the following set of considerations, inter alia, should be considered in implementations of particular embodiments:

Heterogeneous jobs: Due to workload consolidation, production clusters should simultaneously support different types of jobs and services (e.g., production jobs, best-effort jobs). Hence, tasks have highly variable durations and resource needs (e.g., batch jobs, ML, MPI, etc.).

High cluster utilization: Since cluster operators seek to maximize use of resources and thereby return on investment, a scheduler should use the cluster resources to achieve high cluster utilization. Higher cluster utilization may provide the benefit of higher task and job throughput Fast (and predictable) job completion time: Cluster users desire that jobs are performed and exit a system quickly, perhaps as close as possible to the jobs' ideal computational time (e.g., when run on stand-alone dedicated resources). Furthermore, predictable completion times can substantially help with planning.

Sharing policies: Since a cluster is shared amongst multiple users, operators desire support for sharing policies based on fairness and/or capacity constraints.

2.2 Task Queuing

As described herein, the implementation of local queues in Yaq-c, and the management of the different queues in both Yaq-c and Yaq-d are beneficial to particular embodiments. A comparison of embodiments described herein and prior systems is provided.

TABLE 2

Overview of queuing capabilities of prior scheduling frameworks compared to Yaq-c and Yaq-d.

| Framework | scheduling cent/dist | queuing type global | queuing type node | queue management placement | queue management sizing | queue management reordering |
|---|---|---|---|---|---|---|
| YARN | ✓/— | ✓ | | * | | |
| Borg | ✓/— | ✓ | | * | | |
| Sparrow | —/✓ | | ✓ | ✓ | | |
| Apollo | —/✓ | | ✓ | ✓ | | |
| Mercury | ✓/✓ | ✓ | ✓ | ✓ | | |
| Yaq-c | ✓/— | ✓ | ✓ | ✓ | ✓ | ✓ |
| Yaq-d | —/✓ | | ✓ | ✓ | ✓ | ✓ |

(* indicates system performs placement of tasks to nodes but not to queues.)

Table 2 illustrates the type of queuing that some prior systems enable (global queuing and/or local at the nodes), as well as the queue management capabilities they support compared to Yaq-c and Yaq-d. Due to the inherent design of prior systems, distributed and hybrid schedulers (such as Sparrow, Apollo, and Mercury (as are known in the art)) support queuing at the nodes, but not global job queuing. On the other hand, no known existing centralized system supports queuing at worker nodes. This is a deficiency in prior queuing systems that is ameliorated by embodiments of Yaq-c as described herein. Further, although previous systems with queues at worker nodes may implement a task placement policy, no known prior systems implement additional queue management techniques, such as task prioritization through queue reordering, and queue sizing as are described herein and implemented in particular embodiments of Yaq-c and Yaq-d as provided herein.

2.3 Basic System Components

Figure 3:
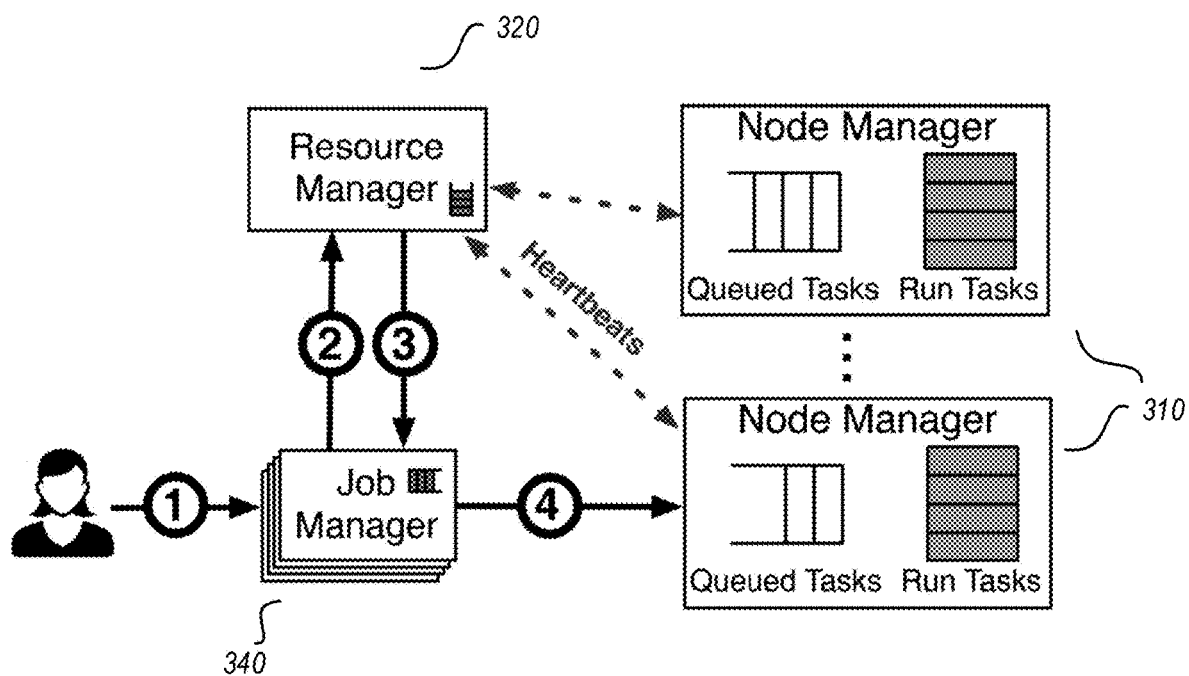
FIG. 3 illustrates an example system architecture for centralized scheduling.
Figure 4:
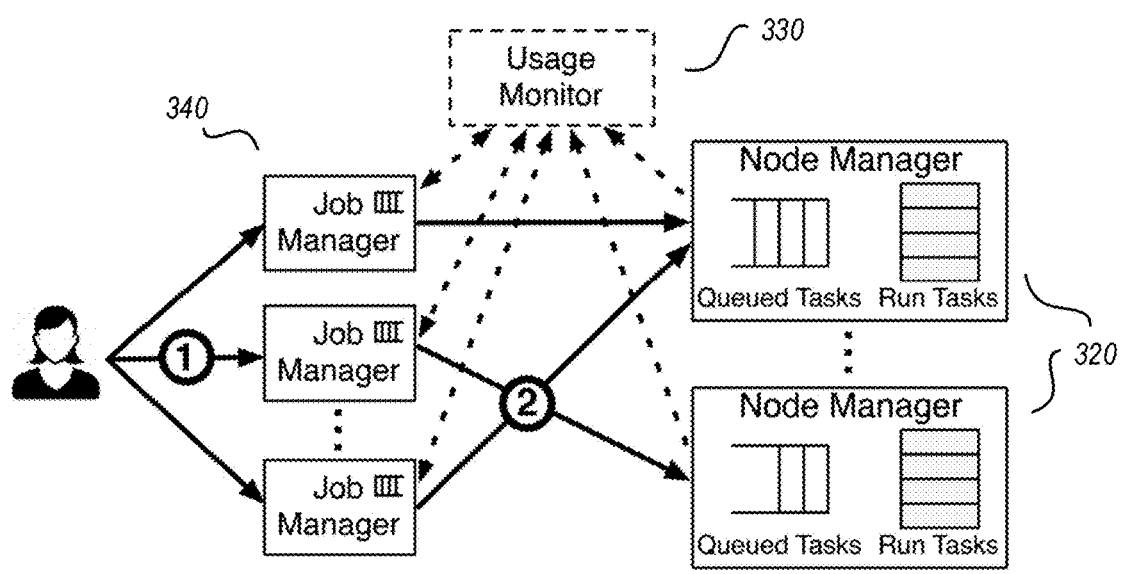
FIG. 4 illustrates an example system architecture for distributed scheduling.

A general system architecture for an example system, depicted in FIG. 3 (for Yaq-c) and FIG. 4 (for Yaq-d), consists of the following main components:

Node Manager (NM) 310 is a service running at each of a cluster's worker nodes, and is responsible for task execution at that node. As illustrated in FIGS. 3 and 4, each NM comprises running tasks and queued tasks lists (e.g., lists and/or queues). The running tasks is a list with the tasks that are currently being executed, thus occupying actual resources at the node. The queued tasks is a queue with the tasks that are waiting on the resources held by the currently running tasks and are thus not occupying actual resources. A task is queued when an NM cannot start its execution (such as, for instance, due to insufficient, busy, or unavailable resources).

Resource Manager (RM) 320 is a component that manages cluster resources in centralized scheduling settings (thus appears only in Yaq-c). NMs may periodically inform the RM about their status through a heartbeat mechanism. Based on the available cluster resources and taking into account various scheduling constraints (e.g., data locality, resource interference, fairness/capacity) and a queue placement policy (to determine where tasks will be queued, if needed), it assigns resources to tasks for execution.

Usage Monitor (UM) 330 is a centralized component to which NMs may periodically report their status. A UM may be used in distributed scheduling frameworks as a form of coordination to perform educated scheduling decisions. This component may not be present in all scheduler embodiments, but a form of a UM has been used in distributed schedulers such as Apollo and Mercury, and may be implemented in particular embodiments of Yaq-d.

Job Manager (JM) 340 is a per-job orchestrator (one JM being instantiated for each submitted job). In a centralized implementation, a JM may negotiate with an RM framework for cluster resources. When a JM receives resources, it may dispatch tasks to the associated nodes for execution. In distributed settings, where there is no central RM, a JM may also act as a scheduler, immediately (or when appropriate) dispatching tasks to nodes.

2.4 Centralized Scheduling with Queues (Yaq-c)

FIG. 3 illustrates an example system architecture for centralized scheduling (e.g., Yaq-c). As shown in the figure, a job's lifecycle may comprise steps as described below. When a client submits a new job to a cluster (or a job is received by or otherwise arrives at the cluster for execution), a JM 340 for this job may be initialized (step 1). The job may comprise a plurality of tasks. The tasks of the job may be added to the queue that is maintained locally in the JM. The JM may then petition the RM 320 (e.g., send a request) for cluster resources based on the resource needs of the job's tasks (step 2). The RM may then choose where to place the tasks based on a policy (such as resource availability, status of queues at the NMs, data locality, etc.). The RM may then notify the JM of the chosen nodes (step 3). The JM may then dispatch the tasks for execution at the specified nodes (step 4). A task may start execution whenever it is allocated resources at the associated node by the NM. Until the task begins execution at the node, it may wait in a queue at the NM. The job's lifecycle terminates when all of its tasks complete execution on the associated nodes.

An RM may perform job admission control, based on available resources and other constraints (e.g., cluster sharing policies). Thus, when a job is submitted, it may wait at a global queue in the RM (shown in the figure), until it is admitted for execution.

2.5 Distributed Scheduling With Queues (Yaq-d)

FIG. 4 illustrates a system architecture for distributed scheduling (e.g., Yaq-c). When a client submits a new job to a cluster (or a job is received by or otherwise arrives at the cluster for execution), a corresponding JM 340 is instantiated (step 1). The JM, which may now be acting as a task scheduler for that job, uses a scheduling policy to select a node to which each of the job's tasks will be dispatched (where different nodes may be selected for different tasks). The scheduling policy may rely at least in part on information that becomes available from the UM 330 (or other source of resource usage and/or availability information). Such information may include the queue status of a node or nodes. The JM may then place each of the job's tasks to the specified nodes for execution (step 2). Similar to the centralized case, if resources in a node are available, task execution may start immediately. Otherwise, the task may wait in a queue until resources become available.

Some embodiments also enable restricting the number of concurrently executing or queued tasks per JM. Further details are discussed in Section 5 (Implementation).

3. Queue Management at Worker Nodes

In some embodiments, queues at worker nodes may be of particular importance since they may determine when a task bound to a node starts execution. This may be the case with either architecture or embodiment, whether centralized or distributed (e.g., Yaq-c or Yaq-d). However, as discussed above, simply maintaining a queue of tasks waiting for execution at worker nodes does not directly translate to benefits in job completion time, especially in the presence of heterogeneous jobs.

To this end, particular embodiments described herein may efficiently manage local node queues. Queue management in particular embodiments may include the following techniques:
 (1) determination of a queue length (Section 3.1);
 (2) determination of a particular node to which each task will be placed for queuing (Section 3.2); and
 (3) prioritizing task execution by reordering a queue (Section 3.3).

Particular embodiments also include cluster-wide queue management policies as discussed in Section 4 (Global Policies).

It may be noted that placing tasks to queues is required whenever actual cluster resources are not sufficient to accommodate all the tasks of all the jobs that are submitted to (or received by) the cluster for execution. Thus, the techniques and embodiments provided herein provide substantial performance improvements in situations of high cluster load. In cases of low cluster load, when available cluster resources exceed what is needed to service all tasks and when no worker-side queuing is needed, Yaq-c may behave like YARN and Yaq-d may behave like Mercury.

To simplify an analysis, slots of resources consisting of memory and CPU (e.g., 4 GB memory & 1 CPU per slot) may be considered. In certain embodiments, the techniques provided herein may also, when applicable, be extended to support multi-dimensional resources.

Task Duration Estimates:

Some embodiments may make use of estimates of task durations. Observations of actual production clusters deployed at Microsoft indicate that more than 60% of jobs may be recurring. For such jobs, an initial estimate of task durations based on previous executions may be assumed. As shown in actual experiments, Yaq performs well even when using only rough estimates (such as an average duration of a map or reduce stage). (Note that more sophisticated models for estimating task durations may be employed by particular embodiments. The average (i.e., simpler approach) was tested to assess exemplary embodiments' behavior even with what may be inaccurate estimates.) In the absence of such estimates, a default task duration may be assumed and a JM may be extended to include functionality to observe actual task durations during runtime and then refine an initial estimate as the execution of a job proceeds.

3.1 Bounding Queue Lengths

Determining the length of queues at worker nodes can be important and beneficial. Queues that are too short lead to lower cluster utilization, as resources may remain idle between allocations. Queues that are too long may incur excessive queuing delays. Embodiments discussed herein may employ at least two mechanisms for bounding queue lengths: length-based queue bounding and delay-based queue bounding.

3.1.1 Length-Based Queue Bounding

In length-based queue bounding, all nodes may have a predefined queue length b, and an RM may place up to b tasks at the queue of each node. To determine the value of b, one may consider the case when all tasks have the same duration, and one may also consider the more general case.

An initial analysis may be based on a centralized design, where task placement may be heartbeat-driven. (Analysis and findings for the distributed case may be expected to be largely similar.)

Fixed Task Duration:

Assume that all tasks have the same duration $1/\mu$ (where $\mu$ is the task processing rate), and calculate a minimum queue length that would guarantee a desired cluster utilization. Let r be the maximum number of tasks that can run concurrently at a node (based on its resources and the minimum resource demand of a task), and $\tau$ the heartbeat interval. Then the maximum task processing rate at the node is $r\mu$. Given r running tasks and b queued tasks, a node will remain fully utilized when:

$$r+b \geq r\mu\tau \text{ or } b \geq r(\mu\tau-1).$$

Interestingly, the above reasoning may be similar in some ways to a bandwidth-delay product for TCP flows, where the goal is to have enough packets in flight to keep a link fully utilized. In cluster scheduling, tasks can be seen as analogous to packets, node processing rate to the link capacity, and heartbeat interval to RTT.

Exponentially-Distributed Task Duration:

Consider an arbitrary node that has r run slots and a queue of length b slots. It is desirable to determine the value of parameter b such that node utilization is at least $1-\delta$ for given parameter $\delta \in (0, 1]$. (Further details and proofs of certain useful propositions are discussed below in Section 3.1.3.) Node utilization in this case is at least as large as the fraction of heartbeat intervals in which all run slots are always busy. It thus suffices to configure the queue length so that the latter quantity is at least of value $1-\delta$.

The following assumptions may be useful. Whenever a node completes processing a task, it may be assumed that it starts processing one of the tasks from the queue taken uniformly at random, if there are any tasks in the queue. It may be assumed that task processing times are independent and identically distributed according to an exponential distribution with mean $1/\mu$. This assumption enables the node utilization to be characterized by applying and leveraging the memory-less property of the exponential distribution.

Proposition 1.

At least a $1-\delta$ fraction of heartbeat intervals will have all run slots always busy, if the queue length b is at least as large as the smallest integer that satisfies:

$$r\mu\tau\left(1+\left(\frac{b+1}{r\mu\tau}\right)\left(\log\left(\frac{b+1}{r\mu\tau}\right)-1\right)\right) \geq \log\left(\frac{1}{\delta}\right). \quad (1)$$

Figure 5:
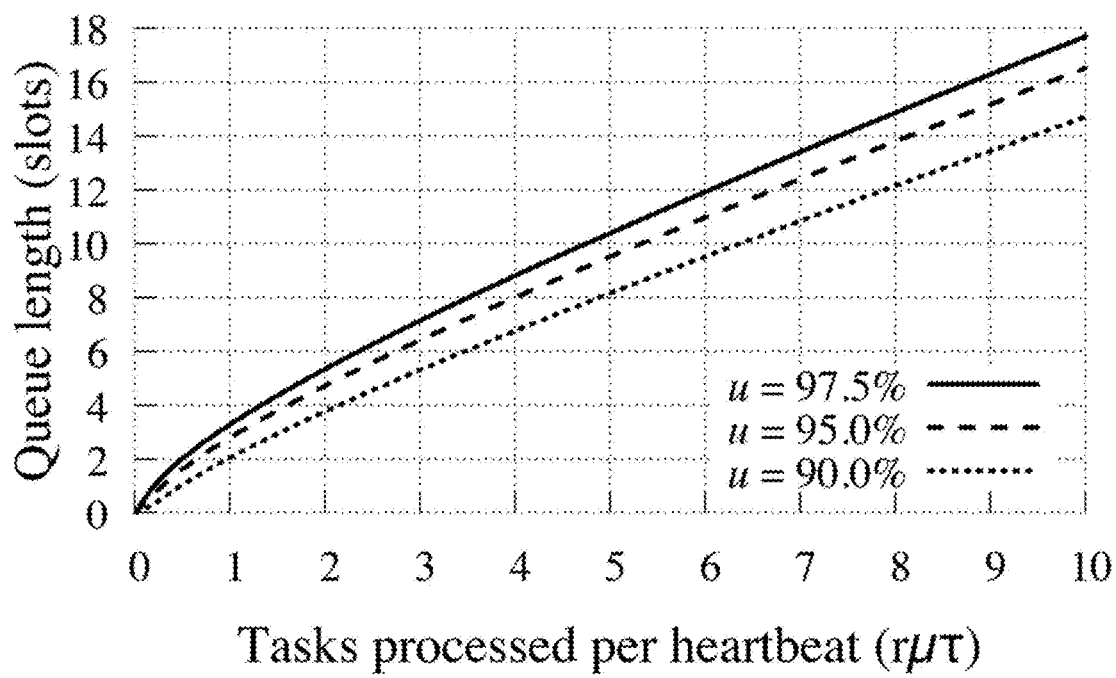
FIG. 5 illustrates queue lengths required to achieve cluster utilizations.

A discussion now of the above asserted sufficient condition (1). If the task processing times were deterministic assuming a common value $1/\mu$ and the length of the heartbeat interval is a multiple of $1/\mu$, then for 100% utilization it is necessary and sufficient to set the queue length such that $b+r=r\mu\tau$. This yields a queue length that is linear in $r\mu\tau$, for any fixed value of the run slots r. The sufficient condition in (1) requires a larger queue length than $r\mu\tau$ for small values of $r\mu\tau$. It can be shown that the sufficient condition (1) requires the queue length that is at least $\tau+\sqrt{\log(1/\delta)}\sqrt{r\mu\tau}$, for large $r\mu\tau$. FIG. 5 provides numerical examples of tasks processed per heartbeat $r\mu\tau$. Specifically, given a heartbeat interval $\tau=3$ sec, an average task duration $1/\mu$ of 10 sec, $r=10$ tasks allowed to be executed at a node at the same time, and a target utilization of 95%, a queue of b=6 slots would be required. Likewise, for an average task duration of 30 sec, a queue size should be 3 slots. These values for b are also validated by actual experiments (as discussed, below, in Section 6) on the production Workload 2 illustrated in FIG. 1.

3.1.2 Delay-Based Queue Bounding

Maintaining queues of the same fixed length across all nodes may not provide optimal results when processing heterogeneous tasks. When short tasks happen to be present in a node, this may lead to under-utilization of the node's resources. When tasks are longer, in contrast, significant delays may incur in processing the longer tasks. Hence, when task durations are available, it may be beneficial to apply a delay-based strategy in determining queue sizes. This strategy relies on an estimated queue wait time that gets reported by each node at regular intervals (as explained in Section 3.2 and Algorithm 2). In particular, a maximum time, $WT_{max}$, may, be specified that a task is allowed to wait in a queue. When a task t is to be placed at the queue of node n (as discussed in Section 3.2), the last estimated queue wait time $WT_n$ reported by node n may be checked. Only when $WT_n < WT_{max}$ would t then be queued at that node. Upon queuing, the RM may use a simple formula to update $WT_n$, taking into account t's task duration estimate, until a fresh value for $WT_n$ is received from node n. Using this method, the number of tasks that get queued to each node may be dynamically adapted, based on the current load of the node and the tasks that are currently running and queued.

Note that this technique can be directly applied in both the centralized and distributed embodiments.

3.1.3 Determining Queue Lengths

In consideration of the issues herein, it is beneficial to consider an arbitrary node that has r run slots and a queue of length b slots and determine a value of the parameter b such that the utilization of the node is at least $1-\delta$ for a given parameter $\delta \in (0, 1]$.

The following assumptions are a basis. Let $\tau$ be the length of a heart-beat interval. The node is fed with new tasks at the beginning of each heart-beat interval such that there are at most r tasks being processed by the node and at most b tasks being queued for processing at the node. Whenever the node completes processing a task it starts processing one of the other tasks from the queue taken uniformly at random, if there are any in the queue. It is assumed that task processing times are independent and identically distributed according to exponential distribution with mean $1/\mu$. This assumption facilitates characterization of the node utilization by leveraging the memory-less property of the exponential distribution.

The node utilization is denoted with u and is defined as the average fraction of time the run slots of the node are busy processing tasks over an asymptotically large time interval. More formally, let $Q_i(t)=1$ if at time t run slot i is busy, and $Q_i(t)=0$, otherwise. Then, the node utilization is defined by $$u = \lim_{T \to \infty} \frac{1}{T} \int_0^T \frac{\sum_{i=1}^r 1(Q_i(t) = 1)}{r} dt$$

where $1(A)=1$ if condition A is true, and $1(A)=0$, otherwise.

Let $X_{n,\lambda}$ be a random variable with distribution that corresponds to the sum of n independent random variables with exponential distribution of mean $1/\lambda$. Note that the distribution of $X_{n,\lambda}$ is an Erlang distribution with parameters n and $\lambda$, which has the density function $$f_{n,\lambda}(x) = \frac{\lambda^n x^{n-1} e^{-\lambda x}}{(n-1)!}, \text{ for } x \geq 0$$

Proposition 2.

Under the given assumptions, the node utilization is given by $$u = 1 - \left( \left(1 - \frac{1}{\mu\tau}\right) Pr[X_{b,r,\mu} \leq \tau] + \frac{1}{\mu\tau} \frac{e^{-\mu\tau}}{\left(1 - \frac{1}{r}\right)^b} Pr[X_{b,(r-1)\mu} \leq \tau] \right)$$

Proof.

We are interested in the node utilization with respect to the stationary distribution. Suppose that time 0 is the beginning of a heart-beat interval. The Palm inversion formula (or "cycle formula") may be used to note that the node utilization is equal to $$u = \frac{\sum_{i=1}^r IE\left[\int_0^T 1(Q_i(t) = 1) dt\right]}{\mu\tau}$$

It suffices to consider an arbitrary run slot i of the node and characterize the expected value of $\int_0^T 1(Q_i(t)=1) dt.$ By the memory-less property of the exponential distribution, there are r+b tasks at time 0 whose (residual) processing times are independent and have exponential distribution with mean $1/\mu$. Whenever there are r tasks being processed by the node, the earliest time until completion of a task is equal in distribution to a minimum of r independent exponentially distributed random variables each with mean $1/\mu$; hence, it has exponential distribution with mean $1/(r\mu)$. It follows that the earliest time at which the queue is empty is equal in distribution to $X_{b,r\mu}$. From this time instance, each run slot completes processing the task assigned to it after an in-dependent random duration that has exponential distribution with mean $1/\mu$. From this discussion, it may be concluded that $IE[\int 1(Q_i(t)=1) dt] = x \, Pr[X_{b,r\mu} \leq \tau] + \int_0^T IE[\min\{\sigma, \tau-x\}] d Pr[X_{b,(r-1)\mu} \leq x]$ where $\sigma$ is a random variable with exponential distribution with mean $1/\mu$.

By simple calculus, we have $$IE[\min\{\sigma, t\}] = \int_0^\infty Pr[\min\{x, t\} > x] dx$$

$$= \int_0^t Pr[\sigma > x] dx$$

$$= \int_0^t e^{-\mu x} dx$$

$$= \frac{1}{\mu}(1 - e^{-\mu t})$$

Hence, it follows that the utilization is given by $$u = Pr[X_{b,r,\mu} > \tau] + \frac{1}{\mu\tau} \int_0^\tau (1 - e^{-\mu(\tau-x)}) dPr[X_{b,r\mu} \leq x]$$

which, by some elementary calculus, can be written as asserted in the proposition. (Q.E.D.)

Notice that, in particular, for a node with zero queue slots $$u = \frac{1 - e^{-\mu\tau}}{\mu\tau}$$

A simple lower bound on the node utilization can be derived as follows. Let $A_k$ denote the event that in the k-th heart-beat interval none of the run slots is every idle. Notice that $u \geq Pr[A_k].$ The event $A_k$ is equivalent to the event that the time elapsed from the k-th heart beat until the completion of the (b+1)-st task, among the tasks present just after the k-th heart beat, is larger than the length of the heart-beat interval $\tau$. Notice that the distribution of this time duration is equal Erlang distribution with parameters b+1 and $r\mu$. Hence, we have $Pr[A_k] = Pr[X_{b+1,r\mu} > \tau]$ It follows that a sufficient condition for the node utilization to be at least $1-\delta$ is the following condition $Pr[X_{b+1,r\mu} \leq \tau] \leq \delta$ (2)

Proposition 3.

A sufficient condition for the probability that in a heart-beat interval none of the run slots is ever idle is at least $1-\delta$ is that the queue length b is the smallest integer such that it holds $$r\mu\tau\left(1 + \left(\frac{b+1}{r\mu\tau}\right)\left(\log\left(\frac{b+1}{r\mu\tau}\right) - 1\right)\right) \geq \log\left(\frac{1}{\delta}\right)$$ (3)

Before providing a proof of the proposition, a discussion of the asserted sufficient condition is useful. If the task processing times were deterministic assuming a common value $1/\mu$ and the length of the heart-beat interval is a multiple of $1/\mu$, then for 100% utilization it is necessary and sufficient to set the queue length such that $b+r=r\mu\tau$. This yields the queue length that is linear in $r\mu\tau$, for any fixed value of the run slots r. The sufficient condition in (3) requires a larger queue length than $r\mu\tau$ for small values of $r\mu\tau$. It can be shown that the sufficient condition (3) requires the queue length that is at least $r\mu\tau+\sqrt{\log(1/\delta)}\sqrt{r\mu\tau}$, for large $r\mu\tau$.

For numerical examples, see FIG. 5. Specifically, given a heartbeat interval $\tau=3$ sec, an average task duration $1/\mu$ of 10 sec, r=10 tasks allowed to be executed at a node at the same time, and a target utilization of 95%, a queue of b=6 slots is required. Likewise, for an average task duration of 30 sec, the queue size should be ≥3 slots. These values for b are validated by the experiments (Section 6) on the production Workload 2 of FIG. 1.

Proof (of Proposition 3):

The proof follows by (2) and the Chernoff's inequality, which is described as follows.

First, the following claim is established:

$$Pr[X_{n,\lambda} \le x] \le e^{-x\lambda\left(1+\frac{n}{\lambda x}\left(\log\left(\frac{n}{\lambda x}\right)-1\right)\right)}, \text{ for } x \ge 0. \quad (4)$$

Let $\sigma_1, \sigma_2, \ldots, \sigma_n$ be a sequence of independent exponentially distributed random variables each of mean $1/\lambda$. Using Chernoff's inequality, for every $\theta>0$, we have $$Pr[X_{n,\lambda} \le x] \le e^{\theta x} I\!E\left[e^{-\theta\sum_{i=1}^{n}\sigma_i}\right]$$

$$= e^{\theta x}\prod_{i=1}^{n} I\!E[e^{-\theta\sigma_i}]$$

$$= e^{\theta x} I\!E[e^{-\theta\sigma_i}]^n$$

$$= e^{\theta x}\left(\frac{\lambda}{\lambda+\theta}\right)^n$$

The minimizer of the last expression is for the value of parameter $\theta$ such that $\lambda x + \theta x = n$.

Hence, the inequality asserted in (4) is obtained.
Using (4), then $$Pr[X_{b+1,r\mu} \le \tau] \le e^{-r\mu\tau\left(1+\frac{b+1}{r\mu\tau}\left(\log\left(\frac{b+1}{r\mu\tau}\right)-1\right)\right)}.$$

By requiring that the right-hand side in the last inequality is smaller than or equal to $\delta$, one obtains the inequality asserted in the proposition.

For every integer value b such that condition (3) holds, we have that $Pr[X_{b+1,r\mu} \le \tau] \le \delta$, which implies the node utilization of at least $1-\delta$. Since the left-hand side of the inequality in (3) is increasing in b, it suffices to choose the queue length that is the smallest integer b such that condition (3) holds. Q.E.D.

3.2 Placement of Tasks to Nodes

Given a job consisting of a set of tasks, a scheduler has to determine the nodes to which those tasks will be placed. An algorithm that Yaq may use for task placement in certain embodiments is introduced. An algorithm that may be used to estimate the time a task has to wait when placed in a node's queue before starting its execution is also presented and employed in particular embodiments. This algorithm is highly beneficial for high quality task placement decisions.

As discussed in Section 2 above, it may be assumed that there is a central component to which each node periodically publishes information about its resource and queue status. This component may be the RM in Yaq-c (as illustrated in FIG. 3), or the UM in Yaq-d (as illustrated in FIG. 4).

An task placement algorithm which may be employed by certain embodiments is outlined in Algorithm 1.

---
Algorithm 1: Placement of task to node
---
Input :
    t: task to be placed;
    Rfmin: min free cluster resources percentage before starting to queue tasks
Output: node where t will be placed
// Avoid queuing when available cluster resources
1    if freeResources / totalResources > Rfmin then
2        return placeTaskNoQueuing(t)
3    else return node n with highest queuingScore(n, t)
// How suitable is node n for placing task t to its queue
4    Function queuingScore(n, t)
        //affScore ∈ (0, 1] based on data locality (or resource
        //interference)when placing t on n (higher is better)
5        affScore ← affinityScore(n, t)
        // Compute load of node based on queue length or
        // queue wait time(using Algorithm 2)
6        nload ← nodeLoad(n)
7        return affScore × 1/nload
Algorithm 1: Placement of task to node

---

Algorithm 1 takes as input a task t and outputs the node n where t should be placed. Yaq may preferentially place tasks at nodes that have available resources since such tasks will incur no queuing delays. Initially, it is checked whether there are such available resources (line 1). If so, task t is placed to a node with available local resources, taking other parameters such as data locality also into account (line 2). If the cluster is almost fully loaded (as defined by the Rfmin parameter given as input), a node with a high with highest queuingScore is chosen to place t (line 3). The function queuingScore (n,t) is used to quantify how suitable a node n is for executing t. The score of a node comprises two components: a node affinity for t and a node load. In some embodiments, node affinity takes into account data locality, but may also be extended to also consider resource interference, providing better resource isolation when executing t. The load of a node may be calculated based on one of the following strategies depending on the richness, completeness, and granularity of the information published by each node:

Based on queue length: Simple information that each node may publish is the size of its queue. This strategy assigns a higher score to nodes with smaller queue lengths. (Note that it may be possible for this to lead to suboptimal placement decisions in case of heterogeneous tasks: a node with two queued tasks of 500 secs each will be chosen over a node with five tasks of 2 secs each.)

Based on queue wait time: This strategy assumes that each node publishes information about the estimated time a task will have to wait at a node before starting its execution, as described below. The lower this estimated wait time is, the higher the score of the node. This strategy may also improve upon the previous one when considering heterogeneous tasks (as was shown experimentally in Section 6.5.2).

Note that Algorithm 1 suggests that the score of all nodes is calculated for placing each task. This may possibly lead to scalability issues, thus, in particular embodiments, various optimizations are applied (e.g., computing the score of each node not for every task but only at regular intervals). Other optimizations may also be applied.

---
Algorithm 2: Estimate queue wait time at node
---
Input: runTasks: running tasks' remaining durations;
       queuedTasks: queued tasks' durations;
       f reeResources: free node resources;
       f reeResources$_{min}$: min free node resources
       before considering a node full
Output: Estimated queue wait time for the next task that will be dispatched
to the node
1    if freeResources ≥ freeResources$_{min}$ then
2       return 0
3    waitTime ← 0
4    for qTask in queuedTasks do
5       minTask ← remove min(runTasks)
6       waitTime ← waitTime + minTask
7       runTasks ← [t − minTask for t in runTasks]
8       runTasks.add(qTask)
9    return waitTime + remove_min(runTasks)

Estimating Queue Wait Time at Worker Nodes:

Algorithm 2 outlines how each worker node may independently estimate the expected queuing delay that a new task will incur if it is placed in that node's queue. Queue wait time estimates are may then be periodically sent to an RM (in Yaq-c) or UM (in Yaq-d) to help with a determination of task placement. Effectively, the algorithm simulates CPU scheduling. It takes as input the remaining durations of the currently running tasks, and the durations of the queued tasks. (These can be estimations of task durations, as explained in Section 3.) If there are available resources, the new task will not have to wait (line 2). Otherwise, the queued tasks are iterated over and the time that each task has to wait before its execution starts is accumulated (lines 4-8). The first task in the queue will have to wait for the running task with the smallest remaining duration to finish. Then that task gets removed from the running task list (line 5), and its task duration gets added to the accumulated queue wait time (line 6). All remaining running task durations get updated (line 7), the first task in the queue gets added to the list of running tasks (line 8), and the same process repeats for all queued tasks.

The algorithm makes the assumption that a queued task can take the slot of any previously running task. The algorithm may be extended in particular embodiments to take into account the exact resources required by each task (e.g., a queue-wait time matrix).

It may be observed that from the time a task gets placed to a node's queue until the moment its execution starts, better placement choices may become available. This may be due to incorrect information during initial task placement (e.g., wrong queue load estimates) or changing cluster conditions (e.g., resource contention, node failures, etc.). Various corrective actions may be taken to mitigate this problem, such as dynamic queue rebalancing, duplicate execution, or work stealing. Since duplicate execution hurts effective cluster utilization, and work stealing makes it hard to account for locality and security constraints in a shared cluster, in some embodiments, Yaq may use queue rebalancing. However, other techniques may also be used instead (or in addition to).

3.3 Prioritizing Task Execution

The queue management techniques presented so far provide measurable benefits for improving task completion time: they reduce queuing delay (Section 3.1) and properly place tasks to queues (Section 3.2). Further improvements in job completion time may be provided by an alternative to executing queued tasks in a FIFO order, by taking into account the characteristics of the tasks and of the jobs they belong to. To this end, a task prioritization algorithm enables reordering queued tasks and can significantly improve job completion times. (See experimental results in Section 6.)

A prioritization algorithm is provided that is generic in that any queue reordering strategy can be easily plugged in. Moreover, the prioritization algorithm is starvation-aware, guaranteeing that no task will be starved due to the existence of other higher priority tasks. Embodiments comprise various reordering strategies, discussed below. Among them, a significant and beneficial family of strategies are job-aware, which consider all of the tasks in a job during reordering. A Shortest Remaining Job First (SRJT) strategy provided significantly improved results in experimental evaluation.

---
Algorithm 3: Compare task priorities
---
Input :
    tasks $t_1$, $t_2$;
    comparison strategy taskCmp;
    hard starvation threshold ST ;
    relative starvation threshold $ST_r$
Output:
    > 0 if $t_1$ has higher priority,
    < 0 if $t_2$ has higher priority,
    else 0
if isStarved($t_1$) xor isStarved($t_2$) then
    if isStarved ($t_1$) then return +1
    else return −1
if !isStarved($t_1$) and !isStarved($t_2$) then
    cmp ← taskCmp($t_1$, $t_2$)
    if cmp ≠ 0 then return cmp
if isStarved($t_1$) and isStarved($t_2$) then
    cmp ← $t_2$.jobArrivalTime − $t_1$.jobArrivalTime
    if cmp/= 0 then return cmp
return $t_1$.queueTime − $t_2$.queueTime
Function isStarved($t_i$)
    return $t_i$.queueTime > min(ST, $t_i$.durationEst × $ST_r$)
Function taskCmp_EJF ($t_1$, $t_2$)
    return t2.jobArrivalTime − $t_1$.jobArrivalTime
Function taskCmp_STF ($t_1$, $t_2$)
    return $t_2$.durationEst − $t_1$.durationEst
Function taskCmp_LRTF ($t_1$, $t_2$)
    return $t_2$.remainingTasksNo − $t_1$.remainingTasksNo
Function taskCmp_SRJF ($t_1$, $t_2$)
    // Use remaining tasks and their duration estimates
    return $t_2$.remaining Work − $t_1$.remainingWork
Algorithm 3: Compare task priorities

---

A task prioritization algorithm is provided in Algorithm 3. The algorithm takes as input two tasks, a taskCmp($t_1$, $t_2$) function (which may be one of a plurality of possible reordering strategies taskCmp_X such as from: SRJF, LRTF, STF, EJF, as discussed below), as well as a hard and a relative starvation threshold, ST. Tasks are marked as starved when appropriate, as explained below, using a function isStarved. Starved tasks have higher priority than non-starved ones. If none of the tasks are starved, the tasks are compared with taskCmp($t_1$, $t_2$). If both tasks are starved, a higher priority may be given to the task of an earlier submitted job. Ties may be broken by comparing the time that each task has waited in the queue, respectively.

Queue Reordering Strategies:

In particular embodiments, each of the following reordering strategies have been implemented and experimentally tested:

Shortest Remaining Job First (SRJF). SRJF gives highest priority to the tasks whose jobs have the least remaining work. The remaining work for a job j is a way to quantify how close j is to completion. It is computed using the formula $$\sigma_{t_i \in RT(j)} t_i \cdot td(t_i),$$

where RT(j) are the non-completed tasks of j and td($t_i$) is the (remaining) task duration of task $t_i$, based on task duration estimates. The remaining work may be propagated from an RM (in Yaq-c) or a UM (in Yaq-d) to the nodes through the existing heartbeats.

Least Remaining Tasks First (LRTF). LRTF is similar to SRJF, but relies on number of remaining tasks to estimate the remaining work. Although this estimate is not as accurate as the one used by SRJF, it is simpler in that it does not require task duration estimates. The remaining tasks number may be propagated from the JM to the nodes through the existing heartbeats.

Shortest Task First (STF). STF orders tasks based on increasing expected duration. This strategy is the only one in this list that is not job-aware, given that it uses only task information and is agnostic of the status of the job the tasks belong to. However, it can provide benefits in particular embodiments when coupled with starvation-aware techniques.

Earliest Job First (EJF). EJF orders tasks based on the arrival time of the job that the tasks belong to. This is essentially a first-in-first-out (FIFO) ordering, and is a default strategy in some schedulers. No additional knowledge is required from the jobs. Although EJF performs no reordering, as described above, it may be used in particular embodiments to discriminate between starved tasks.

Some strategies may be oblivious to the job structure (e.g., whether a task belongs to a map or reduce phase of an M/R (map/reduce) job, the structure of a DAG (directed acyclic graph) job, etc.). Some embodiments may apply novel strategies that account for job structure which can be used to further prioritize task execution. Moreover, in the presence of multi-dimensional resources, it may be possible to momentarily violate a reordering strategy in order to provide better resource packing and thus achieve higher resource utilization.

Starvation-Aware Queue Reordering:

All of the discussed strategies except EJF may lead to starvation or to excessive delays for some tasks. For example, long tasks may suffer with STF if short tasks keep arriving. Similarly, tasks of large jobs might suffer with LRTF and SRJF. To circumvent this problem, during reordering it may be checked whether a task has waited too long in the queue. If so, the waiting task may be given higher priority. In particular, both a hard (ST) threshold and a relative ($ST_r$) threshold may be specified. A task may be marked as starved if it has waited longer than $ST_r$ times its duration or if it has waited longer than ST secs. $ST_r$ allows short tasks to starve faster than long ones (e.g., a 2-sec task should be marked as starved sooner than a 500-sec task, but not more than ST secs).

4. Global Policies

The queue management techniques presented so far have focused on task execution at specific nodes. Yaq may also be coupled with cluster-wide policies. In particular, techniques for global job reordering in the case of a centralized design, and imposing sharing policies, such as fairness and capacity, may be included in particular embodiments.

4.1 Global Job Reordering

As discussed herein, Yaq-c may maintain a queue of jobs at an RM. (Note that there would be no global job reordering in a distributed Yaq-d implementation, as there would be no global queue in the system.) Along with task reordering at each node, job reordering strategies may also be used at a RM. Similar to task reordering strategies presented above, SRJF, LRTF and EJF may be applied at the job level. More specifically, SRJF would assign higher priority to jobs with the smallest remaining work, whereas LRTF would prioritize jobs with the least remaining number of tasks. EJF uses a FIFO queue. Analogous to STF, would be Shortest Job First (SJF), using available information about job durations. Moreover, starvation-aware techniques may be applied here as well, to prevent jobs from waiting too long in an RM queue. More advanced multi-resource packing techniques may also be employed in particular embodiments.

Prioritizing jobs at an RM, on its own, can be beneficial. However, in Yaq global job reordering interoperating with local task reordering strategies have further considerations, as there may be a possibility of conflicting goals. For example, when SRJF/LRTF are used both globally and locally, they are expected to further improve job completion times. However, this may not be the case when SRJF is enabled globally and EJF locally: the former will favor jobs that are close to completion, whereas the latter will locally favor tasks with smaller duration. Initial experimental results indicate that there may be combinations that can further improve job completion times.

4.2 Sharing Policies

Scheduling frameworks facilitate sharing of cluster resources among different users by imposing sharing policies. For instance, particular implementations may impose fairness (each user getting a fair share of a cluster) and/or capacity (each user getting a particular percentage of a cluster) constraints. For instance, two users, A and B, could each be given an equal share of the cluster (e.g., fair share), or each could be given some particular capacity (e.g., user A takes 80% of the cluster and user B takes 20% of the cluster). Weighted fair sharing in a distributed setting may also be imposed.

These (as well as some prior existing) techniques can be applied in Yaq-c and Yaq-d in order to impose sharing constraints over both running and queued tasks. However, a scheduling framework has to impose constraints over the actual cluster resources. (This is what a user actually observes.) When task prioritization is disabled, the sharing constraints over the actual resources will be met, as each task will be executed in the order it was submitted by the scheduler. A problem may arise in case of queue reordering: the scheduler has imposed constraints assuming a specific execution order, but this order might change, giving resources to the wrong users, thus exceeding their cluster share against others.

To circumvent this problem, the starvation threshold ST of the discussed prioritization algorithm is employed. In particular, given that each task is marked as starved after ST seconds, actual resources will be given to it and sharing constraints will be met after that period of time. (As long as task preemption is enabled, otherwise a starved task has to wait for one of the running tasks to finish its execution.) As experimentally shown in Section 6.4, Yaq-c is indeed able to successfully meet strict capacity constraints with only slight momentary violations.

The discussed techniques are pessimistic in that they not take advantage of user information about the queued tasks. If two tasks belong to the same user, they are not actually causing violation of sharing constraints between them. This may be solved by pushing auxiliary information about the users to worker nodes. Moreover, task prioritization strategies may be employed to momentarily allow violations of sharing constraints in order to achieve improved job completion times (e.g., using some form of deficit counters).

5. Implementation

Figure 15:
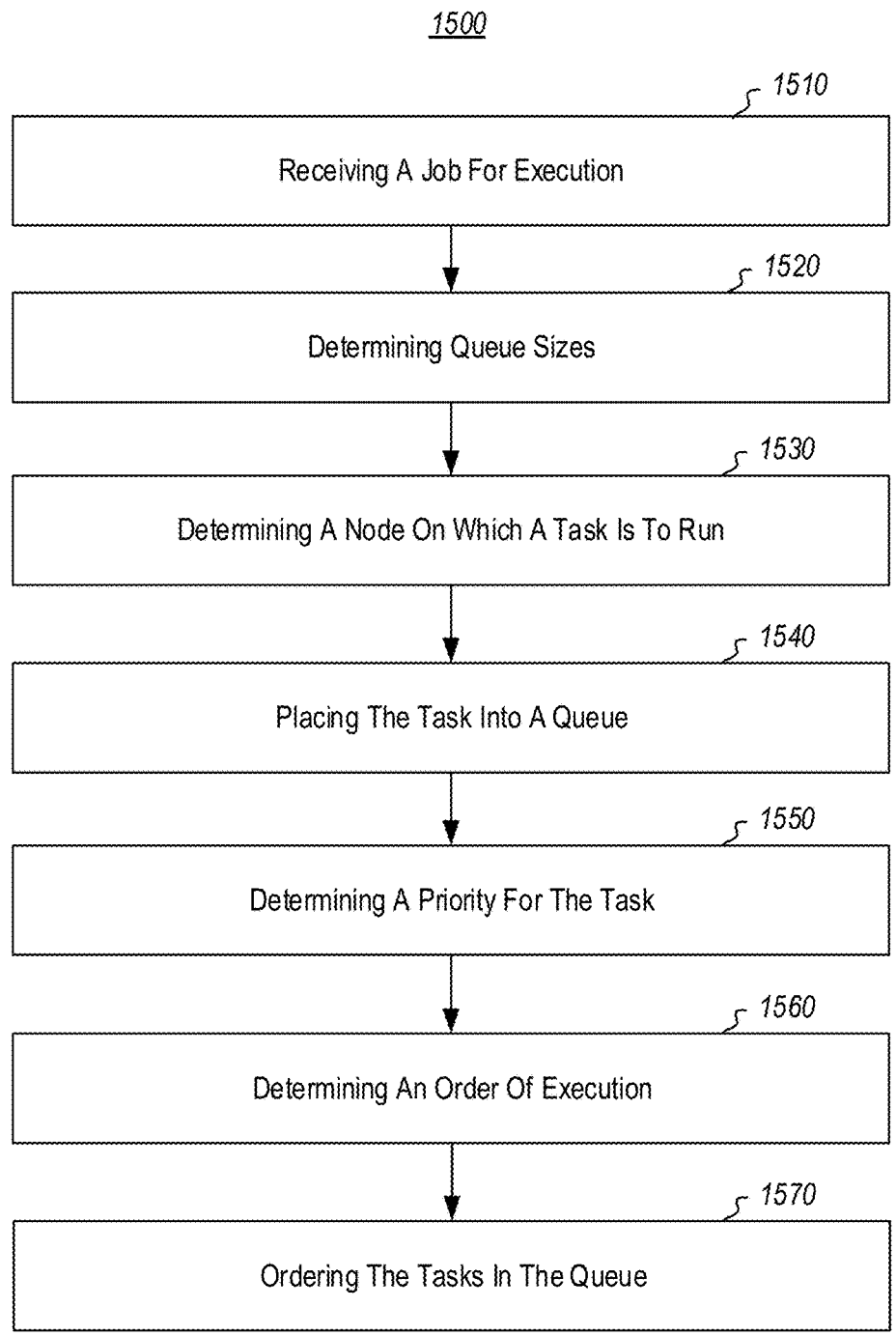
FIG. 15 illustrates an example computing environment.

As described, herein are provided methods, systems, and computer program products for managing task queues for tasks which are to be executed in a distributed computing environment. FIG. 15, for example, illustrates a computer-implemented method for efficient queue management for cluster scheduling and managing task queues for tasks which are to be executed in a distributed computing environment. The method 1500 may include receiving 1510 a job at a cluster for execution. The job may comprise one or more tasks. The method may include determining one or more queue sizes 1520 for one or more queues into which tasks are to be placed for execution in the distributed computing environment. A node of a plurality of nodes in the distributed computing environment (e.g., cluster) on which a task is to run may be determined 1530. The task may be placed into a queue 1540 such that the task will be run on the determined node. A priority for the task relative to other tasks in the queue may also be determined 1550. Based on the priority of the task, an order of execution for all tasks in the queue may also be determined 1560. The tasks in the queue may then be ordered 1570 based on the determined order of execution.

Yaq-c:

Yaq-c may be implemented in some embodiments, for example, by extending Apache Hadoop YARN as follows.

First, extend YARN's NM to allow local queuing of tasks, and implement the queue management techniques discussed herein for bounding queue lengths (Section 3.1) and/or prioritizing task execution (Section 3.3).

Second, extend YARN's scheduler to enable placement of tasks to queues (Section 3.2), support job prioritization (Section 4.1) and respect cluster sharing constraints in the presence of task queuing (Section 4.2).

In a particular embodiment, a modified Hadoop capacity scheduler may be used, but the techniques discussed herein can be applied to any Hadoop-compatible scheduler (e.g., Dominant Resource Fairness (DRF), Hadoop fair scheduler, etc.).

Yaq-d:

Yaq-d may be implemented, for example, by extending the distributed part of Mercury that already supports queuing at worker nodes. In particular, techniques discussed herein may be implemented for task placement to queues and task prioritization on top of Mercury. In a particular embodiment, queue lengths are not bound, although, in other embodiments, that may be possible by allowing tasks to be queued at the JMs, in case no queue slots are available in a node. However, as experimental results show, implementation of embodiments described herein provide significant gains over Mercury, even without bounding queue lengths Computing Environment Embodiments as described herein may be implemented and/or practiced within a computing environment and, specifically, a distributed computing environment.

Figure 16:
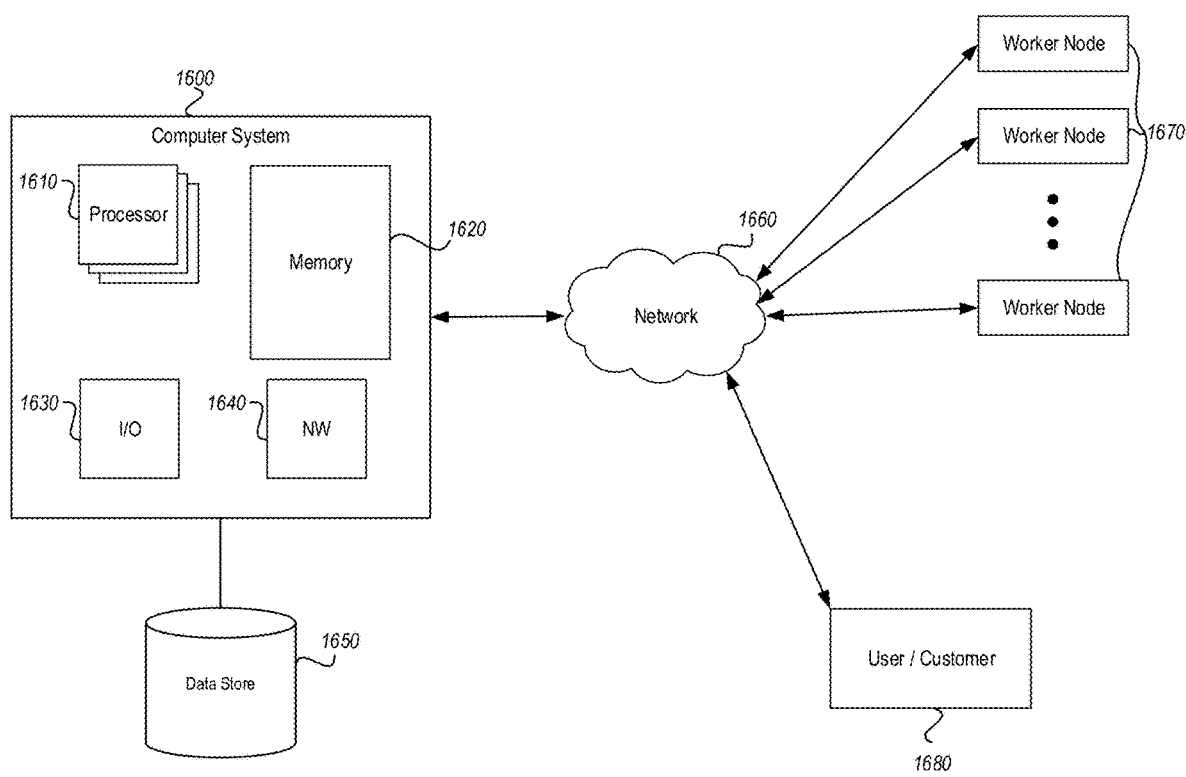
FIG. 16 illustrates a flow chart for a method for managing task queues for tasks which are to be executed in a distributed computing environment.

FIG. 16 illustrates an example computing environment that facilitates and enables embodiments for efficient queue management for cluster scheduling. As depicted, embodiments may comprise or utilize a special-purpose or general-purpose computer system 1600 that includes computer hardware, such as, for example, one or more processor(s) 1610, system memory 1620, one or more data stores 1650, networking and communication interfaces and hardware 1640, and/or input/output hardware 1630.

The computer system 1600 may be connected over a network 1660 to a user or customer computer 1680 which may submit jobs to be run within a cluster or distributed computing environment. The computer system 1600 may also be connected over a network 1660 to one or more worker nodes 1670 which provide processing resources for a cluster or cloud computing environment. As may be known in the art, each of the worker nodes, themselves, may be fully equipped computing nodes comprising processors, memory, data storage, communication interfaces, etc.

Embodiments within the scope of the present invention include physical and other computer-readable media for carrying or storing computer-executable instructions and/or data structures. Such computer-readable media can be any available media that can be accessed by the computer system 1600. Computer-readable media that store computer-executable instructions and/or data structures are computer storage devices. Computer-readable media that carry computer-executable instructions and/or data structures are transmission media. Thus, by way of example, and not limitation, embodiments of the invention can comprise at least two distinctly different kinds of computer-readable media: computer storage devices and transmission media.

Computer storage devices are physical hardware devices that store computer-executable instructions and/or data structures. Computer storage devices include various computer hardware, such as RAM, ROM, EEPROM, solid state drives ("SSDs"), flash memory, phase-change memory ("PCM"), optical disk storage, magnetic disk storage or other magnetic storage devices, or any other hardware device(s) which can be used to store program code in the form of computer-executable instructions or data structures, and which can be accessed and executed by the computer system 1600 to implement the disclosed functionality of the invention. Thus, for example, computer storage devices may include the depicted system memory 1620, the depicted data store 1650 which can store computer-executable instructions and/or data structures, or other storage such as on-processor storage, as discussed later.

Transmission media can include a network and/or data links which can be used to carry program code in the form of computer-executable instructions or data structures, and which can be accessed by the computer system 1600. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media. For example, the input/output hardware 1630 and/or a network interface 1640 may comprise hardware (e.g., a network interface module (e.g., a "NIC")) that connects a network and/or data link which can be used to carry program code in the form of computer-executable instructions or data structures.

Further, upon reaching various computer system components, program code in the form of computer-executable instructions or data structures can be transferred automatically from transmission media to computer storage devices (or vice versa). For example, computer-executable instructions or data structures received over a network or data link can be buffered in RAM within a NIC (e.g., input/output hardware 1630), and then eventually transferred to the system memory 1620 and/or to less volatile computer storage devices (e.g., data store 1650) at the computer system 1600. Thus, it should be understood that computer storage devices can be included in computer system components that also (or even primarily) utilize transmission media.

Computer-executable instructions comprise, for example, instructions and data which, when executed at the processor(s) 1610, cause the computer system 1600 to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

6. Experimental Evaluation

Extensive evaluation was performed to validate the benefits of the techniques and embodiments are described herein. Both experimental and actual production evaluations, using various workloads on experimental and production clusters, were performed.

Results of actual experimental evaluation provide at least the following:

Yaq-c improves median job completion time (JCT) by 1.7× when compared to previous YARN over a production workload.

Yaq-d, when evaluated over the same workload, achieves 9.3× better median JCT when compared to a scheduler that mimics previous Sparrow's batch sampling, and 3.9× better median JCT when compared to the distributed version of previous Mercury.

Task prioritization provides demonstrably pronounced benefits, and a combination of all techniques provided herein provides a configuration that provides even better results.

Embodiments as described and presented herein have been tested and proven to provide benefits over previously available systems and technologies. Experiments were performed to compare the performance improvement that Yaq-c and Yaq-d provide when compared to previous designs of a similar type (i.e., centralized and distributed, respectively). (Note, comparisons of Yaq-c with Yaq-d were not provided.) Since Yaq-c and Yaq-d follow different architectures, each of them targets different scenarios: high level placement decisions and strict cluster sharing policies for Yaq-c versus fast allocation latency and scalability for Yaq-d. Applying the techniques described herein to hybrid schedulers may also provide benefits over previously known systems.

Results from experimental evaluations are provided to demonstrate the benefits of the methods, techniques, systems, and embodiments described herein and the improvements over prior systems and techniques. The performance of both Yaq-c (Section 6.2) and Yaq-d (Section 6.3) (over a Hive production workload used at Microsoft) was assessed and compared against existing centralized and distributed scheduling schemes. It is also shown that Yaq-c can successfully impose sharing invariants (Section 6.4). A set of micro-experiments that highlight specific components of the designs herein, such as queue-bounding, task placement, and task prioritization, are also shown (Section 6.5).

6.1 Experimental Setup

Cluster Setup:

Yaq-c and Yaq-d were deployed on a cluster of 80 machines and used for evaluation. Each machine had a dual quad-core Intel Xeon ES-2660 processor with hyper-threading enabled (i.e., 32 virtual cores), 128 GB of RAM, 10×3 TB data drives configured as a JBOD. Inter-machine communication is 10 Gbps.

The experimental Yaq-c implementation was extended from YARN 2.7.1. The same YARN version was used to compare against "stock" YARN. The Mercury implementation that was used was based on YARN 2.4.2, and the same holds for Yaq-d, having been built by extending Mercury (as we explained in Section 5). Tez 0.4.1 was used to execute all workloads, Hive 0.13 was used for the Hive workload described below. All experiments used a heartbeat interval of 3 sec (which is also a typical value used in actual YARN clusters at Yahoo!).

Workloads:

To evaluate Yaq-c and Yaq-d against other approaches, a Hive-MS workload was used (and is also a Hive workload used internally at Microsoft to perform data analysis). This Hive workload is the Workload 2 depicted in FIG. 1. The workload consists of 185 queries, each query having one map and one reduce phase. The underlying data consists of five relations with a total size of 2.49 PB. Each job has an average of 57.9 mappers and 1.5 reducers. Tasks among all jobs have an average duration of 22.9 sec with a standard deviation of 27.8 sec, when run on stock YARN.

Synthetic GridMix workloads were also used, each consisting of 100 tasks/job executed for 30 min, where:

(1) X sec is a homogeneous workload where all tasks in a job have the same task duration (e.g., 5 sec),
(2) Mixed-5-50 is a heterogeneous workload comprising of 80% jobs with 5-second tasks and 20% jobs with 50-second tasks, and
(3) GridMix-MS is another heterogeneous workload, in which task sizes follow an exponential distribution with a mean of 49 sec. GridMix-MS is based on Microsoft's production Workload 1, depicted in FIG. 1, after scaling down the longer task durations to adapt them to the duration of our runs and the size of our cluster.

Further, in the experiments, the scheduler gets as input an estimated average task duration of the stage (map or reduce) each task belongs to, as observed by previous executions of the same job. (Such simple estimates were deliberately provided in order to assess Yaq under imprecise task durations.) These estimates were then used during placement of tasks to nodes and for some of the task prioritization algorithms provided herein (and discussed in Section 3).

Metrics:

The analysis was based on the following metrics:

job completion time (JCT), which is the time from the moment a job started its execution until the moment all tasks of the job finished execution;

slot utilization, which is the number of slots (e.g., 4 GB and 1 CPU per slot) occupied at each moment across all machines, divided by the total number of slots in the cluster;

task queuing delay, which is the time from the moment a task gets placed in a node's queue until its execution starts; and average job throughput, which is the number of jobs in a workload, divided by the total time needed to execute all jobs, and is used to calculate effective cluster throughput.

TABLE 3

Average task queuing delay and job throughput for Yaq-c on Hive-MS workload.

| | Task queuing delay (sec) | | | Job throughput |
|---|---|---|---|---|
| | mean | stdev | median | jobs/min |
| Yaq-c | 8.5 | 21.4 | 1.1 | 13.9 |
| Yaq-c (unbounded) | 65.5 | 85.1 | 30.4 | 5.6 |
| Yaq-c (no reorder) | 53.2 | 78.2 | 25.4 | 7.6 |
| YARN | — | — | — | 8.8 |

6.2 Evaluating Yaq-c

Figure 6:
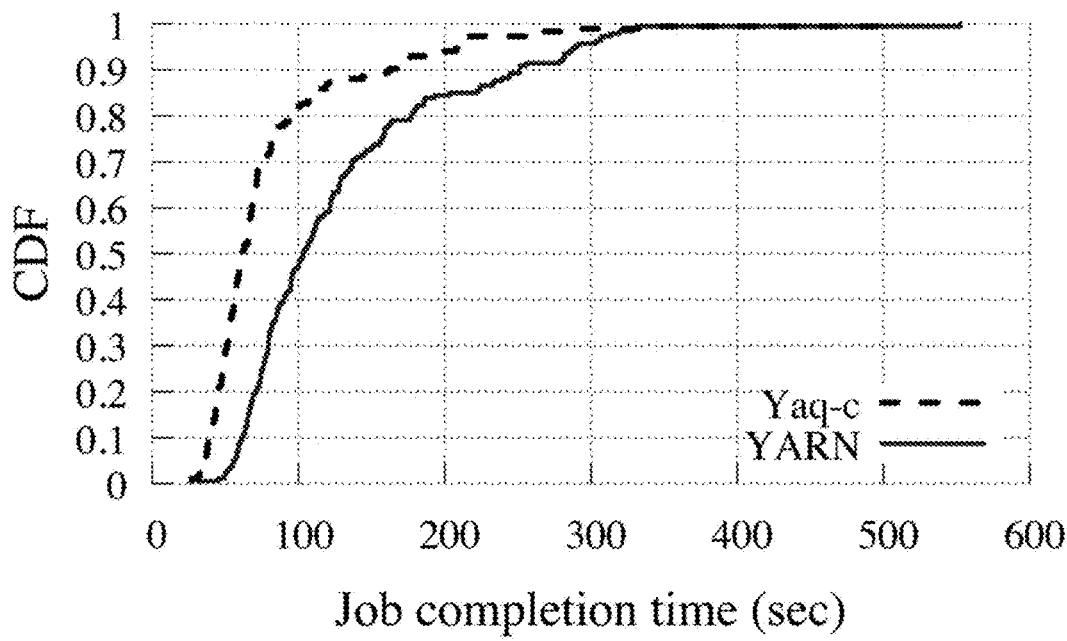
FIG. 6 illustrates job completions times for an exemplary Yaq-c implementation.

To evaluate Yaq-c, Yaq-c was compared against stock YARN. For Yaq-c, a queue size of four slots, the queue wait time-based placement policy (Section 3.2) and the SRJF prioritization policy (Section 3.3), were used (and provided good results). The queue size used coincides with the queue size suggested by an analysis using Equation 1. FIG. 6 shows that Yaq-c achieves better job completion times across all percentiles with a 1.7× improvement for median job completion time. As shown in Table 3, Yaq-c also improves job throughput by 1.6× over prior, unmodified YARN. These gains are due to the higher cluster utilization Yaq-c achieves by having worker-side queues. To illustrate the benefit of the queue management techniques provided herein, Table 3 illustrates performance numbers for Yaq-c if queue length bounding or task prioritization is disabled. In the absence of the techniques provided herein, there may be excessive task queuing delays that negatively impacts job throughput, resulting in worse performance. Further, Yaq-c achieves a median task queuing delay of only 1.1 sec.

TABLE 4

Average task queuing delay and job throughput for Yaq-d on Hive-MS workload.

| | Task queuing delay (sec) | | | Job throughput |
|---|---|---|---|---|
| | mean | stdev | median | jobs/min |
| Yaq-d | 17.9 | 54.2 | 0.35 | 16.6 |
| Yaq-d (unbounded) | 34.2 | 67.0 | 5.6 | 10.1 |
| Distributed Mercury | 49.7 | 73.7 | 12.9 | 5.8 |
| Distributed (batch) | 81.4 | 101.4 | 26.2 | 5.3 |

6.3 Evaluating Yaq-d

Yaq-d was evaluated against two other distributed scheduler variants: distributed Mercury, which uses the distributed part of prior, unmodified Mercury, and distributed batch sampling, for which Mercury was modified to perform task placement using batch sampling, as a way to simulate task placement as is done by Sparrow. Two different Yaq-d configurations, with and without dynamic queue rebalancing, were used (Section 3.2). Further, the queue wait time-based placement policy (Section 3.2) and the SRJF prioritization policy with a 10-sec hard starvation threshold (Section 3.3) were used.

Figure 7:
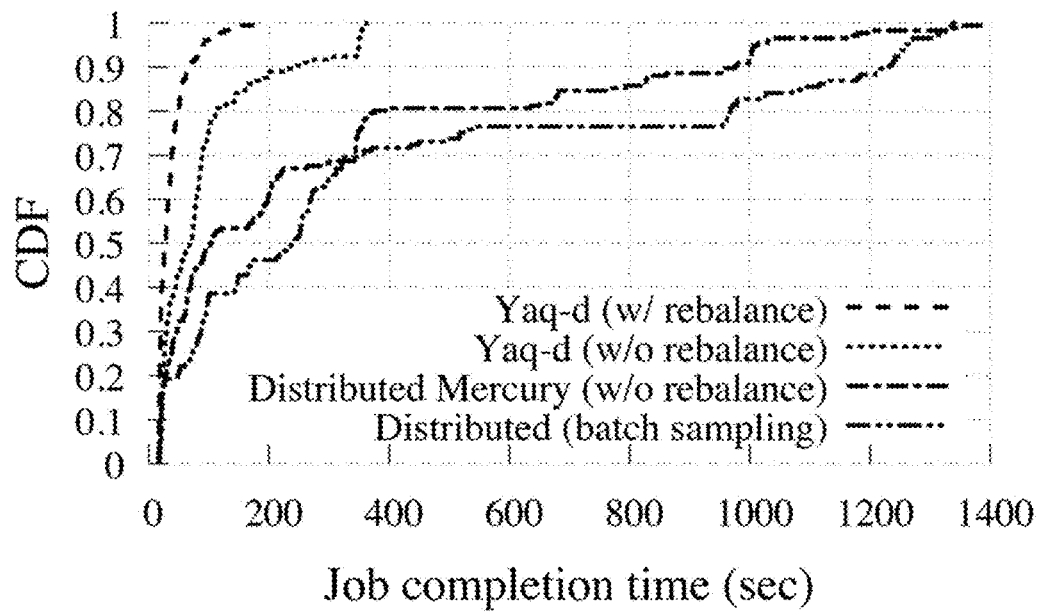
FIG. 7 illustrates job completions times for an exemplary Yaq-d implementation.

The results for the Hive-MS workload are depicted in FIG. 7 and Table 4. Yaq-d (with rebalance) improves job completion time (JCT) across all percentiles when compared to both prior Mercury and batch sampling. In particular, it achieves better median JCT by 3.9× over prior Mercury and by 9.3× over batch sampling. These improvements are due to the efficient management of the local queues, as task queuing delays and thus the head-of-line blocking are significantly reduced.

Observe that in the experimental Yaq-d implementation, late binding of tasks to nodes is not used, as it conflicts with some of prior YARN's design choices. (As known to those with skill in the art and familiar with Sparrow, late binding on top of batch sampling may improve average job completion time by 14% and the 95th percentile by 30%.) Therefore, even if late binding is implemented, Yaq-d would most probably still significantly outperform Sparrow.

As can be seen from Table 4, Yaq-d also achieves a higher job throughput by 2.9× over prior Mercury and by 3.1× over batch sampling. When configuring Mercury and batch sampling, the number of jobs that are allowed to be executed concurrently were tuned: allowing too many concurrent jobs improves job throughput but hurts JCT (due to having tasks belonging to many different jobs being queued at the nodes without properly sizing or reordering the queues); allowing fewer jobs improves JCT but leads to lower utilization and hurts job throughput. Job throughput for Mercury and batch sampling might be improved by allowing more concurrent jobs, but that would lead to even worse JCT. On the contrary, however, Yaq-d improves both JCT and job throughput at the same time.

6.4 Imposing Sharing Constraints

Figure 8:
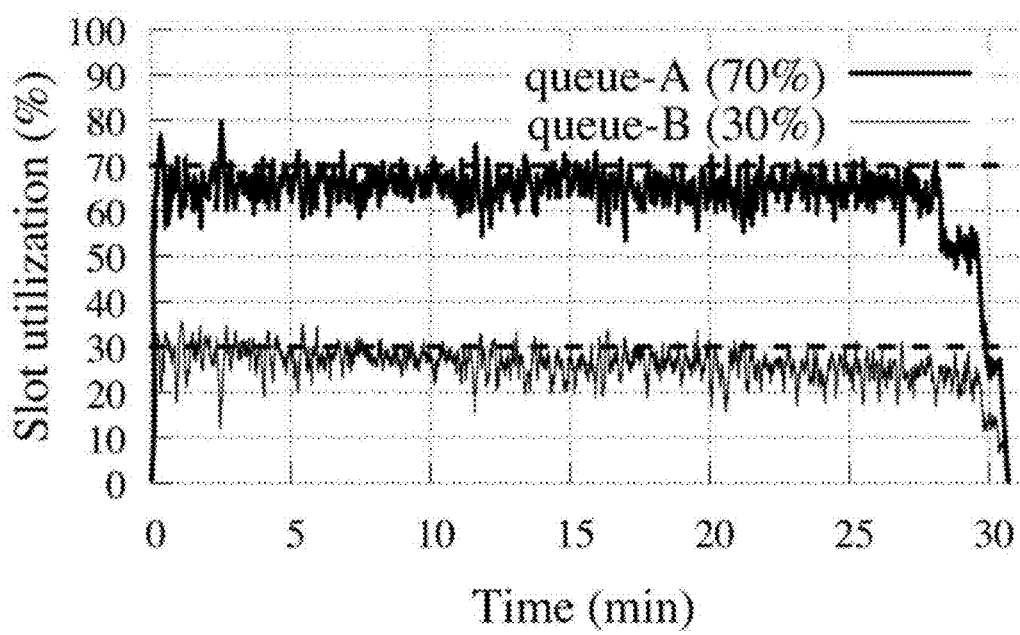
FIG. 8 illustrates capacity constraints imposed in Yaq-c.

As discussed in Section 4.2, task prioritization may potentially lead to violation of cluster-wide sharing policies. To this end, Yaq-c is used, whose implementation extends and employs a Hadoop capacity scheduler (as explained in Section 5) that is capable of imposing capacity quotas on each user of a cluster. To investigate whether Yaq-c continues to respect such cluster-wide sharing policies despite task prioritization, a capacity scheduler is configured with two queues, A and B, where the cluster capacity is split 70% and 30% respectively. A GridMix workload is run that submits jobs to both queues with equal probability. FIG. 8 shows cluster-wide slot utilization for each of these two queues measured from the perspective of all worker nodes. As FIG. 8 shows, Yaq-c respects each queue's capacity with only some momentary slight violations.

6.5 Micro-Experiments

Specific aspects of the queue management techniques provided herein are evaluated using a set of micro-experiments. In these runs, synthetic GridMix workloads are used, which make it easier to experiment with different task duration distributions, whenever needed. The effects of bounding queuing lengths (Section 6.5.1), task placement choices (Section 6.5.2), and task prioritization strategies (Section 6.5.3), are all evaluated.

Particular techniques described herein are also evaluated over a heavy-tailed distribution (Section 6.5.4). Here Yaq-c is used (but similar trends with Yaq-d for task placement and prioritization were also observed).

6.5.1 Bounding Queuing Delays

Impact of queue length in cluster utilization and job completion times (JCT) is evaluated. To this end, task prioritization is purposely disabled.

Figure 9:
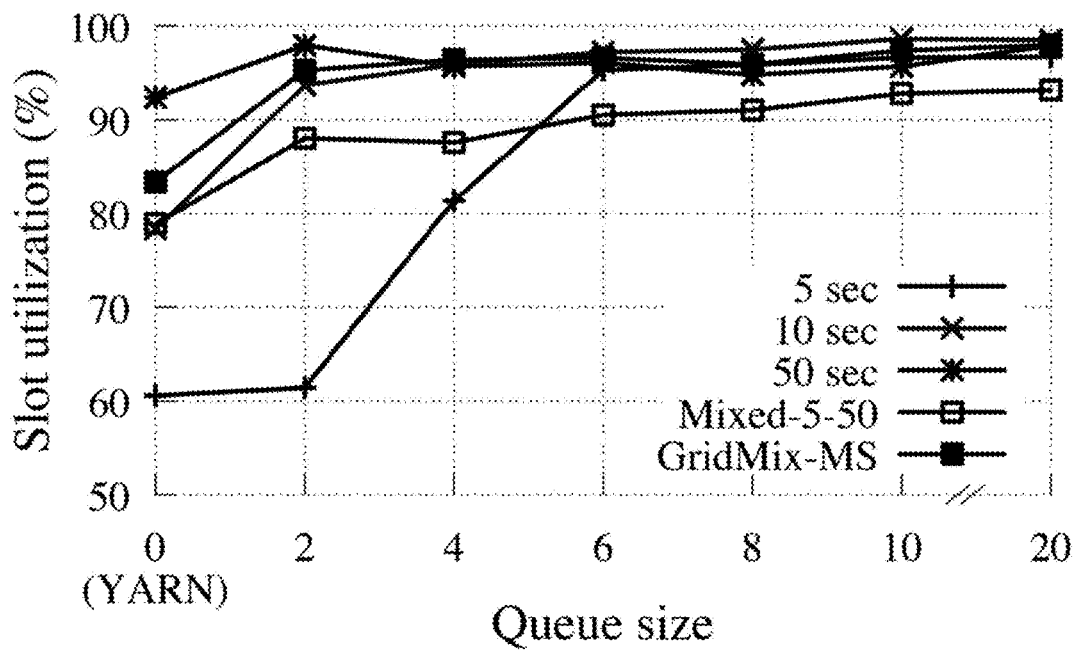
FIG. 9 illustrates average cluster utilization with different workloads and queue lengths.

FIG. 9 shows how slot utilization for Yaq-c varies for different workloads when introducing queuing at worker nodes. By masking feedback delays between the RM and NM, Yaq-c is able to prevent slots from becoming idle. The gains are particularly pronounced when task durations are short: for 5-sec tasks, average utilization is 60% with YARN but goes up to 96% with Yaq-c. The graphs also show that utilization improves with longer queue sizes, as expected. Furthermore, once the nodes are saturated increasing the queue sizes even further does not improve utilization. For instance, the 5 sec workload needs a queue size of six slots to achieve full utilization, while for the 50 sec workload a queue size of two slots is sufficient.

Figure 10:
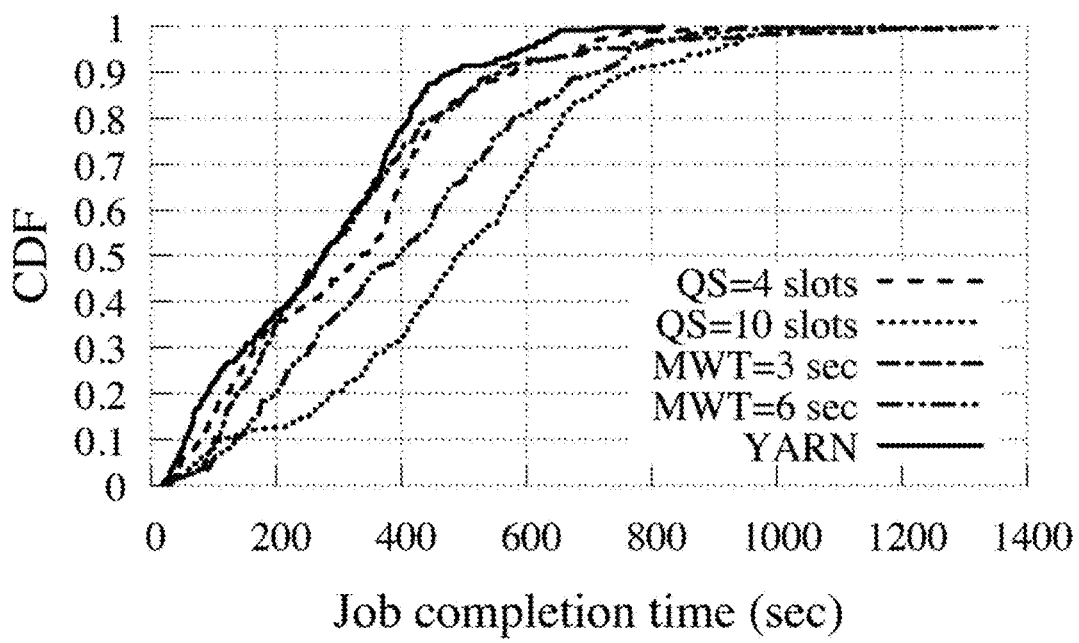
FIG. 10 illustrates job completion times for a particular workload when applying different queue bounding techniques.

FIG. 10 compares job completion time (JCT) of a GridMix-MS workload with YARN and both length-based (QS=x denotes that x tasks are allowed to be queued) and delay-based bounding (MWT=x denotes that queuing delay should not exceed x sec.). For fixed queue lengths, it can be seen that JCT increases with queue length. This is to be expected since increased queue lengths introduce higher queuing delays, without further improving utilization (as shown in FIG. 9). Furthermore, the tail of the distribution also increases substantially when queue lengths increase, by upwards of 1.7× for MWT=3 as compared to YARN.

FIG. 9 and Table 3 reveal that simple queues at worker nodes, even if bounded, negatively impact job completion times most of the time. Only in a small number of cases, for some homogeneous workloads, are improvements in JCT seen just by bounding queue lengths. However, as shown in Table 3 and in Section 6.5.3, queue bounding coupled with task prioritization (as described herein) brings significant JCT gains.

6.5.2 Task Placement at Queues

Figure 11:
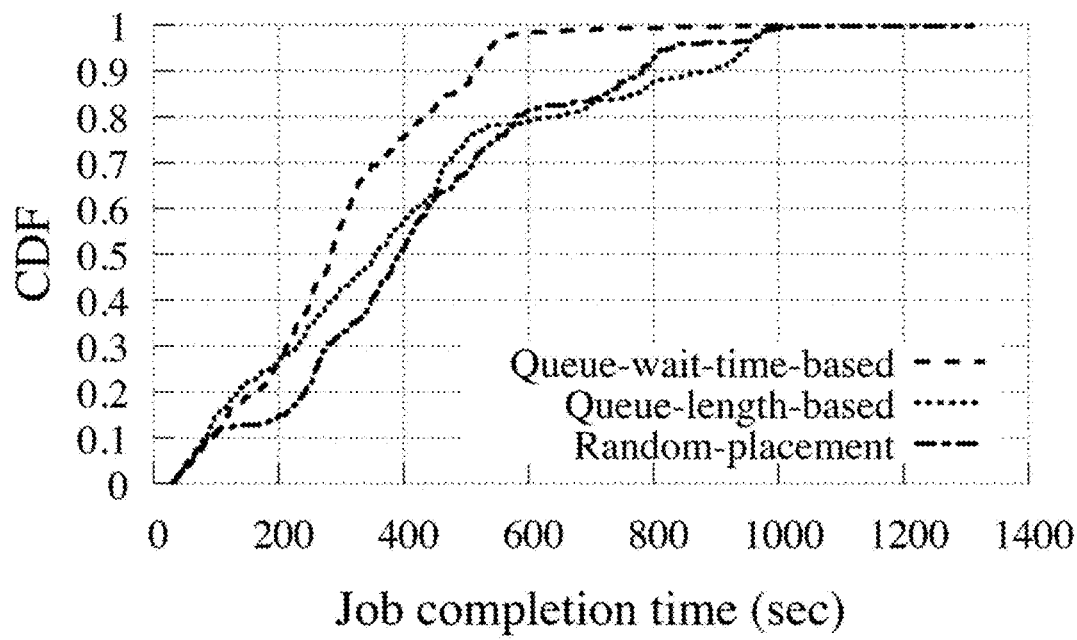
FIG. 11 illustrates job completion times for a particular workload when applying different resource manager (RM) placement policies.

Different task placement strategies are also compared. Two strategies are used, namely queue length-based and queue wait time-based placement (see Section 3.2), as well as a random placement strategy that randomly assigns tasks to nodes. A fixed queue size of six slots is used with task prioritization disabled. Job completion times for these runs are shown in FIG. 11. As might be expected, placement that is based on queue wait time outperforms the rest of the strategies, since it uses richer and more complete information about the status of the queues. In particular, it improves median job completion time by 1.2× when compared to the queue length-based and by 1.4× to the random strategy. It may also be noted that the random placement has a significantly longer tail. Accordingly, experiments used a queue wait time-based placement.

6.5.3 Task Prioritization at Worker Nodes

Figure 12:
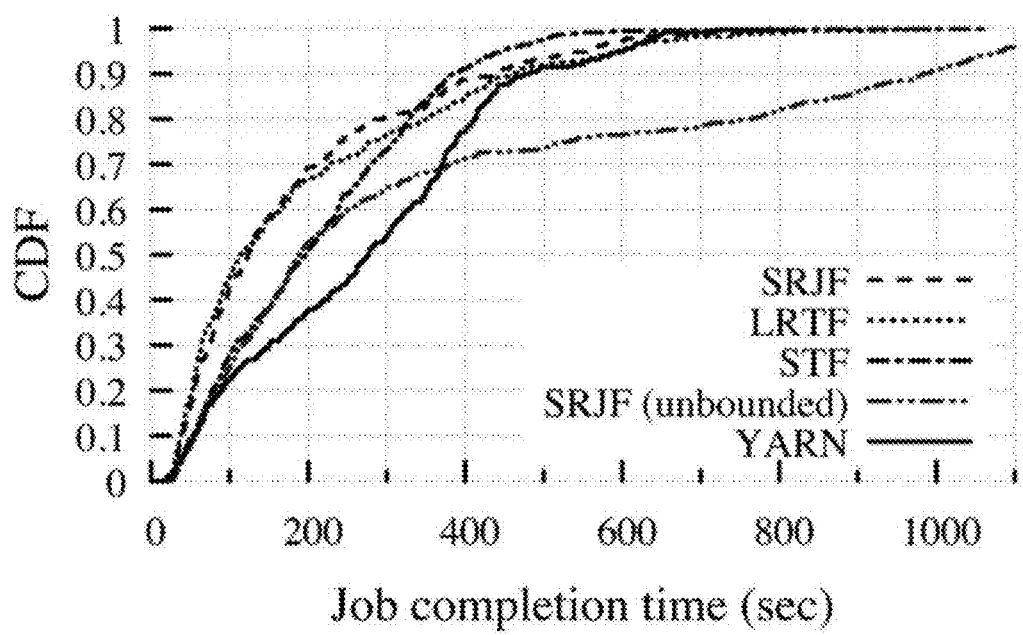
FIG. 12 illustrates completion times for a particular workload when applying different task prioritization techniques.

FIG. 12 shows job completion times (JCT) for our three task reordering algorithms (LRTF, SRJF, STF). A queue length of ten slots was used (unless otherwise stated), and no hard or relative starvation thresholds.

The job-aware policies SRJF and LRTF perform best when compared to YARN: 2.2× better median JCT for SRJF and 2.4× for LRTF. The non job-aware STF reordering policy performs 1.4× better than YARN. The difference in performance between STF and the other methods is that STF is more aggressive than others in attempting to fix head-of-line blocking issues, but can quickly lead to starvation issues. Thus, job progress is a much more reliable metric to use when reordering than local metrics that STF uses. Interestingly, for the GridMix workload, LRTF performed better than SRJF (most probably due to the predictability of the synthetic workload). However, in a real Hive-MS workload, SRJF worked best.

FIG. 12 also illustrates a run with SRJF prioritization and no queue bounding (marked "unbounded"). This run shows that with queue bounding disabled, task prioritization improves the lower percentiles of JCT, but negatively impacts the higher ones. Based also on the results of Table 3, it becomes clear that combining task prioritization with queue bounding provides better results in terms of JCT.

Starvation Threshold:

Various runs were performed to study the impact that starvation thresholds (see Section 3.3) have on the performance of Yaq-c. A hard starvation threshold (ST) and relative starvation threshold ($ST_r$) both provide an ability to limit how long a task is starved. $ST_r$ was empirically found to provide less benefit in decreasing overall job completion time (JCT) when compared to the effects of ST. The results presented here showcase the effect of various hard starvation limits for the STF reordering policy, which benefits the most from the starvation parameter (given it is not job-aware as discussed above).

Figure 13:
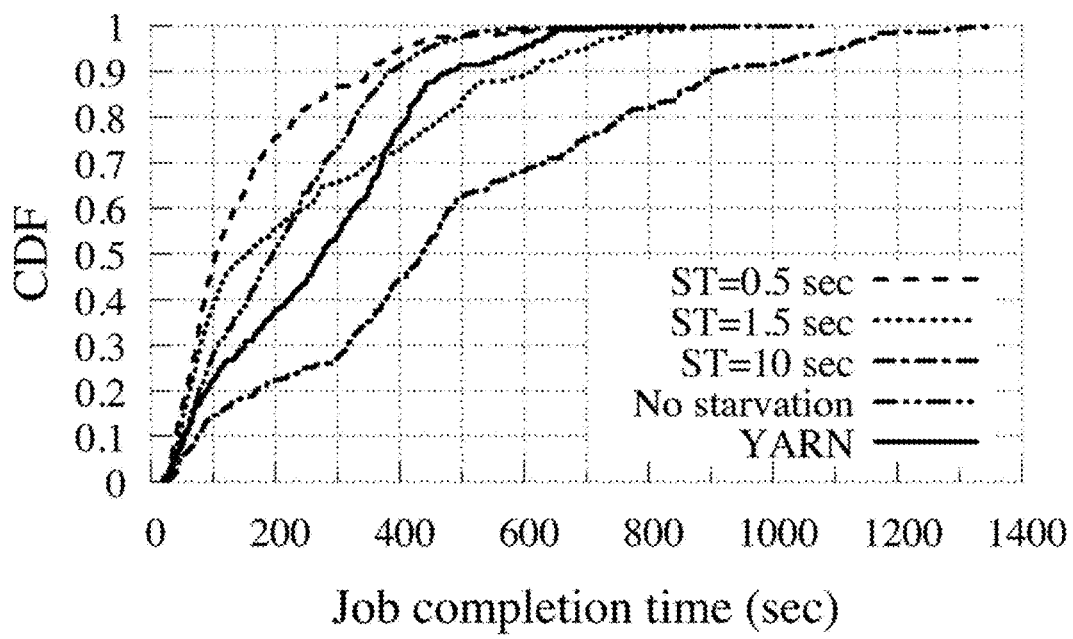
FIG. 13 illustrates completion times for a particular workload when applying different hard starvation thresholds.

FIG. 13 shows JCT with the GridMix-MS workload using STF reordering, a fixed queue size of ten slots, and various ST values. First, we observe that STF is sensitive to the ST value that is used. A value of 0.5 sec, which marks tasks as starved early, essentially falling back to the EJF strategy, works best for this synthetic workload with tasks of each job being relatively homogeneous. High values (ST=10 sec) are detrimental, whereas a value of 1.5 sec improves JCT for some jobs. Experiments also revealed that SRJF and LRTF reordering are less sensitive to different ST values and that relatively higher values can give better results. Being job-aware, these strategies already prioritize the execution of starved straggler tasks. For instance, an ST value of 10 sec worked better on (a more realistic) Hive-MS production workload with SRJF. This also suggests that the ST value should be calibrated based on the characteristics of the workloads and the used strategy.

6.5.4 Heavy-Tailed Workload

Figure 14:
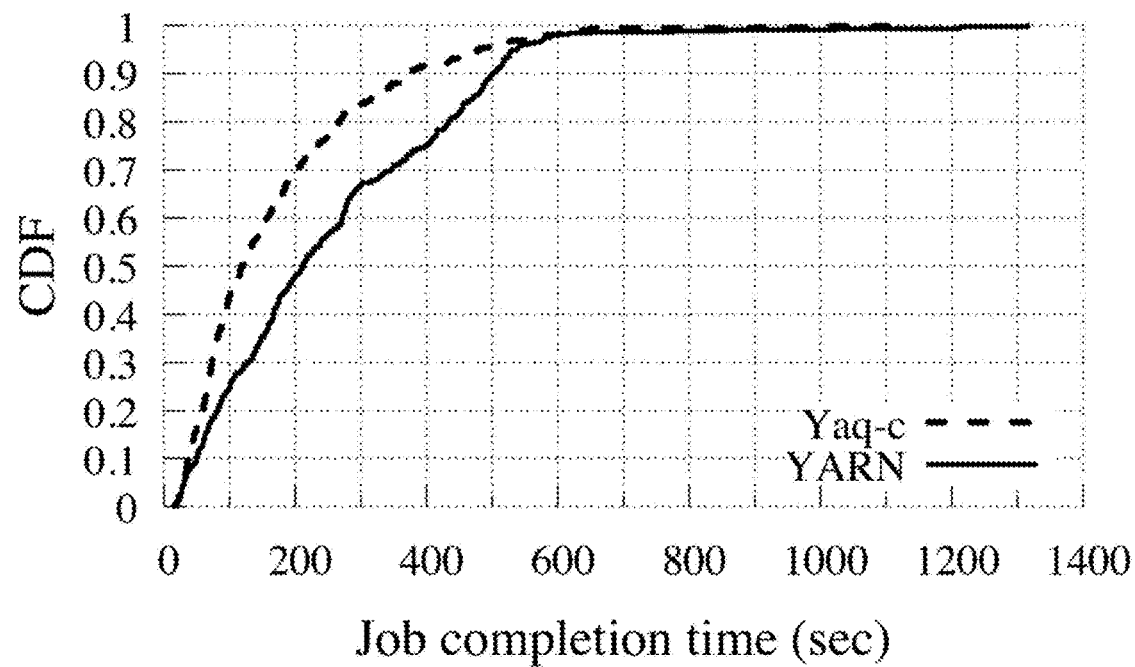
FIG. 14 illustrates completion times for a particular heavy-tailed workload.

The task durations of the particular heterogeneous workloads used (GridMix-MS and Hive-MS) follow an exponential distribution. In order to assess the impact of the techniques presented herein on workloads with different characteristics, GridMix-MS was also modified so that its task durations follow a heavy-tailed distribution. Specifically, the duration of the longest 20% tasks was increased by 500 secs. Yaq-c was used with a queue length of ten slots and the SRJF reordering strategy. FIG. 14 show the gains in JCT that Yaq-c yields for this heavy-tailed workload. In particular, it improves median job completion time by 1.8× when compared with prior YARN.

7. Conclusion

It had been observed that choosing between previous existing cluster scheduling frameworks imposes an unnecessary trade-off. On one hand centralized schedulers favor predictable execution at the expense of utilization; on the other hand, distributed schedulers improve cluster utilization but suffer from high job completion time when workloads are heterogeneous. To improve upon this trade-off, queues at worker nodes were introduced by embodiments presented herein. In particular, a novel contribution is that by employing queues for centralized frameworks, utilization comparable to distributed schemes may be achieved. Policies for active queue management are provided, carefully choosing which task to execute next whenever a running task exits, with the goal of fast job completion times. The policies developed and described are equally applicable to both centralized and distributed scheduling frameworks.

Embodiments of Yaq implement an extension to YARN, deployed on a large cluster, and gains using production as well as synthetic workloads were experimentally demonstrated. Yaq (both Yaq-c and Yaq-d as presented herein) improves job completion time across all percentiles and, in particular, improves median job completion time by up to 9.3×, when compared to previous existing scheduling schemes, such as prior YARN, Mercury, and an implementation of Sparrow batch sampling on Mercury.

Although the techniques, methods, systems, and computer program products have been described in language specific to certain features and/or methodological acts, it is to be understood that the subject matter defined in the appended claims is not necessarily limited to the specific features or acts described. Rather, the specific features and acts are disclosed as example forms of implementing the claimed subject matter, and other equivalent features and methods are intended to be within the scope of the appended claims. Further, various different embodiments are described and it is to be appreciated that each described embodiment can be implemented independently or in connection with one or more other described embodiments.

What is claimed is:

1. In a distributed computing environment, a method for managing task queues for tasks that are to be executed in the distributed computing environment, the method comprising:
    determining one or more queue sizes for one or more queues into which tasks are to be placed for execution in the distributed computing environment;
    determining a node of a plurality of nodes in the distributed computing environment on which a task is to run;
    placing the task into a queue such that the task will be run on the determined node;
    determining a priority for the task relative to other tasks in the queue;
    based on the priority of the task, determining an order of execution for all tasks in the queue, wherein determining an order of execution is starvation-aware and applies both a hard starvation threshold and a relative starvation threshold to prevent starvation of tasks in the queue, the relative starvation threshold calculated relative to an estimated execution duration of the task; and
    ordering the tasks in the queue based on the determined order of execution.

2. The method of claim 1, further comprising centralized scheduling wherein, when a job comprising one or more tasks is scheduled to be run in the distributed computing environment, a job manager is initialized, the job manager receiving information identifying which node of the plurality of nodes each task of the job is to be placed on to run, and the job manager placing the each task on the identified node to be run.

3. The method of claim 1, further comprising distributed scheduling wherein, when a job comprising one or more tasks is scheduled to be run in the distributed computing environment, a job manager is instantiated which determines, for each task of the job, which node of a plurality of nodes the each task is to be placed to run.

4. The method of claim 1, wherein determining one or more queue sizes comprises dynamically computing a length-based bounding.

5. The method of claim 1, wherein determining one or more queue sizes comprises dynamically computing a delay-based bounding.

6. The method of claim 1, wherein determining an order of execution comprises applying Shortest Remaining Job First (SRJF).

7. The method of claim 1, wherein determining an order of execution comprises applying Least Remaining Tasks First (LRTF).

8. The method of claim 1, wherein determining an order of execution comprises applying Shortest Task First (STF).

9. The method of claim 1, wherein determining an order of execution comprises applying Earliest Job First (EJF).

10. A system for managing task queues for tasks that are to be executed in a distributed computing environment, the system comprising one or more computer processors and one or more data storage devices having stored thereon computer-executable instructions which, when executed upon the one or more computer processors, enable the system to perform:

receiving a job to be performed in the distributed computing environment, the job comprising a plurality of tasks;

determining one or more queue sizes for one or more queues into which the tasks are to be placed for execution in the distributed computing environment;

for each task in the job, determining a node of a plurality of nodes in the distributed computing environment on which the task is to run;

placing the task into a queue such that the task will be run on the determined node;

determining a priority for the task relative to other tasks in the queue;

based on the priority of the task, determining an order of execution for all tasks in the queue, wherein determining an order of execution is starvation-aware and applies both a hard starvation threshold and a relative starvation threshold to prevent starvation of tasks in the queue, the relative starvation threshold calculated relative to an estimated execution duration of the task; and ordering the tasks in the queue based on the determined order of execution.

11. The system of claim 10, wherein the system is further enabled to perform centralized scheduling wherein, when a job comprising one or more tasks is scheduled to be run in the distributed computing environment, a job manager is initialized, the job manager receiving information identifying which node of the plurality of nodes each task of the job is to be placed on to run, and the job manager placing the each task on the identified node to be run.

12. The system of claim 10, wherein the system is further enabled to perform distributed scheduling wherein, when a job comprising one or more tasks is scheduled to be run in the distributed computing environment, a job manager is instantiated which determines, for each task of the job, which node of a plurality of nodes the each task is to be placed to run.

13. The system of claim 10, wherein the system is further enabled to perform determining one or more queue sizes comprises dynamically computing a length-based bounding.

14. The system of claim 10, wherein the system is further enabled to perform determining one or more queue sizes comprises dynamically computing a delay-based bounding.

15. A computer program product for managing task queues for tasks that are to be executed in a distributed computing environment, the computer program product comprising one or more data storage devices having stored thereon computer-executable instructions which, when executed upon one or more computer processors of a computer system, enable the system to perform:

receiving, from each of one or more users, a job to be performed in the distributed computing environment, each job comprising a plurality of tasks;

for each job of the one or more users, performing:

determining one or more queue sizes for one or more queues into which the tasks of the each job are to be placed for execution in the distributed computing environment;

for each task of the each job, determining a node of a plurality of nodes in the distributed computing environment on which the each task is to run;

placing the each task into a queue such that the task will be run on the determined node;

determining a priority for the each task relative to other tasks in the queue;

based on the priority of the each task, determining an order of execution for all tasks in the queue, wherein determining an order of execution is starvation-aware and applies both a hard starvation threshold and a relative starvation threshold to prevent starvation of tasks in the queue, the relative starvation threshold calculated relative to an estimated execution duration of the task; and ordering the tasks in the queue based on the determined order of execution.

16. The computer program product of claim 15, wherein the computer-executable instructions further enable the system to perform centralized scheduling wherein, when a job comprising one or more tasks is scheduled to be run in the distributed computing environment, a job manager is initialized, the job manager receiving information identifying which node of the plurality of nodes each task of the job is to be placed on to run, and the job manager placing the each task on the identified node to be run.

17. The computer program product of claim 15, wherein the computer-executable instructions further enable the system to perform distributed scheduling wherein, when a job comprising one or more tasks is scheduled to be run in the distributed computing environment, a job manager is instantiated which determines, for each task of the job, which node of a plurality of nodes the each task is to be placed to run.

18. The computer program product of claim 15, wherein the computer-executable instructions further enable the system to perform determining one or more queue sizes comprises dynamically computing a length-based bounding.

19. The system of claim 15, wherein the computer-executable instructions further enable the system to perform determining one or more queue sizes comprises dynamically computing a delay-based bounding.

* * * * *